United States Patent [19]

Hollier

[11] Patent Number: 5,621,854

[45] Date of Patent: Apr. 15, 1997

[54] METHOD AND APPARATUS FOR OBJECTIVE SPEECH QUALITY MEASUREMENTS OF TELECOMMUNICATION EQUIPMENT

[75] Inventor: Michael P. Hollier, Suffolk, England

[73] Assignee: British Telecommunications public limited company, London, England

[21] Appl. No.: 351,421

[22] PCT Filed: Jun. 24, 1993

[86] PCT No.: PCT/GB93/01322

§ 371 Date: Dec. 12, 1994

§ 102(e) Date: Dec. 12, 1994

[87] PCT Pub. No.: WO94/00922

PCT Pub. Date: Jan. 6, 1994

[30]     Foreign Application Priority Data

Jun. 24, 1992 [GB] United Kingdom ............... 9213459

[51] Int. Cl.$^6$ ...................................................... H04B 3/46
[52] U.S. Cl. ...................................... 395/2.37; 395/2.42
[58] Field of Search .................................. 395/2.37, 2.42; 381/46, 47, 73.1

[56]             References Cited

U.S. PATENT DOCUMENTS

| 4,860,360 | 8/1989 | Boggs ................................ | 395/2.42 |
| 4,972,484 | 11/1990 | Theile et al. ....................... | 395/2.36 |

FOREIGN PATENT DOCUMENTS

| 2218299 | 11/1989 | United Kingdom. |
| 2218300 | 11/1989 | United Kingdom. |
| WO94/00922 | 1/1994 | WIPO. |

OTHER PUBLICATIONS

John G. Beerends and Jan A. Stemerdink, "Measuring the Quality of Audio Devices", Preprint 3070 (L–8) of a paper presented at the 90th Convention of the Audio Engineering Society, p. 5 Feb. 1991.

Hiroshi Irii, Keita Kurashima, Nobuhiko Kitawaki, and Kenzo Itoh "Objective Measurement Method for Estimating Speech Quality of Low–Bit–Rate Speech Coding", NTT Review, vol. 3, No. 5, pp. 79–87 Sep. 1991.

Beerends et al, "A Perceptual Audio Quality Measure Based on A Psychoacoustic Sound Representation", J. Audio Eng. Soc., vol. 40, No. 12, 1992, pp. 963–978.

Brandenburg et al, "'NMR' and 'Masking Flag': Evaluation of Quality Using Perceptual Criteria", AES 11th International Conferences, pp. 169–179, 1992.

Kalittsev, "Estimate of the Information content of Speech Signals Based on Modern Speech Analysis", 1298 Telecommunications and Radio Engineering 47 (1992) Jan., No. 1, New York, US, pp. 11–15.

Zwicker et al, "Audio Engineering and Psychoacoustics: Matching Signals to the Final Receiver, the Human Auditory System", J. Audio Eng. Soc., vol. 39, No. 3, 1991 Mar., pp. 115–126.

(List continued on next page.)

Primary Examiner—Allen R. MacDonald
Assistant Examiner—Tálivaldis Ivars Šmits
Attorney, Agent, or Firm—Nixon & Vanderhye P.C.

[57]             ABSTRACT

A telecommunications testing apparatus comprising a signal generator which generates a speech-like synthetic signal, which is supplied to the input of a telecommunication apparatus to be tested. The distorted output of the telecommunications apparatus is supplied to an analyzer, which derives, for both the undistorted test signal and the distorted signal from the telecommunications apparatus, a measure of the excitation of the human auditory system generated by both signals, taking into account both spectral masking and temporal masking phenomena. The difference between the two excitations is then calculated, and a measure of the loudness of the difference is derived which is found to indicate to a high degree of accuracy the human subjective response to the distortion introduced by the telecommunications system.

65 Claims, 12 Drawing Sheets

OTHER PUBLICATIONS

Dimolitsas et al, "Objective Speech Distortion Measures and Their Relevance of Speech Quality Assessments", IEE Proceedings, vol. 136, Pt. 1, No. 5, Oct. 1989, pp. 317–324.

Herre et al, "Analysis tool for Realtime Measurements Using Perceptual Criteria", AES 11th International Conference, 1992, pp. 180–190.

Moore et al, "Suggested Formulae For Calculating Auditory–Filter Bandwidths and Excitation Patterns", J. Acoust. Soc. AM. 74(3), Sep. 1983, pp. 750–753.

METHOD AND APPARATUS FOR OBJECTIVE SPEECH QUALITY MEASUREMENTS OF TELECOMMUNICATION EQUIPMENT

RELATED APPLICATIONS

This application is related to my copending CIP applications Ser. Nos. 08/564,069 filed Dec. 14, 1995; 08/624,489 filed Apr. 4, 1996; 08/671,931 filed Jun. 27, 1996; and PCT/GB98/01821.

BACKGROUND OF THE INVENTION

1. Field of the Invention

This invention relates to a method and apparatus for testing telecommunications apparatus.

2. Related Art

In testing telecommunications apparatus (for example, a telephone line, a telephone network, or communications apparatus such as a coder) a test signal is introduced to the input of the telecommunications apparatus, and some test is applied to the resulting output of the apparatus. It is known to derive "objective" test measurements, such as the signal to noise ratio, which can be calculated by automatic processing apparatus. It is also known to apply "subjective" tests, in which a human listener listens to the output of the telecommunications apparatus, and gives an opinion as to the quality of the output.

Some elements of telecommunications systems are linear. Accordingly, it is possible to apply simple artificial test signals, such as discrete frequency sine waves, swept sine signals or chirp signals, random or pseudo random noise signals, or impulses. The output signal can then be analyzed using, for example, Fast Fourier Transform (FET) or some other spectral analysis technique. One or more such simple test signals are sufficient to characterise the behaviour of a linear system.

On the other hand, modern telecommunications systems include an increasing number of elements which are non-linear and/or time variant. For example, modern low bit-rate digital speech coders, forming part of mobile telephone systems, have a nonlinear response and automatic gain controls (AGCs), voice activity detectors (VADs) and associated voice switches, and burst errors contribute time variations to telecommunications systems of which they form part. Accordingly, it is increasingly less possible to use simple test methods developed for linear systems to derive objective measure of the distortion or acceptability of telecommunications apparatus.

On the other hand, subjective testing by using human listeners is expensive, time-consuming, difficult to perform, and inconsistent. However, despite these problems the low correlation between objective measures of system performance or distortion and the subjective response of a human user of the system means that such subjective testing remains the best way of testing telecommunications apparatus.

Recently in the paper "Measuring the Quality of Audio Devices" by John G. Beerends and Jan A. Stemerdink, presented at the 90th AES Convention, 1991 Feb. 19–22, Paris, printed in AES Preprints as Preprint 3070 (L-8) by the Audio Engineering Society, it has been proposed to measure the quality of a speech coder for digital mobile radio by using, as test signals; a database of real recorded speech and analyzing the corresponding output of the coder using a perceptual analysis method designed to correspond in some aspects to the processes which are thought to occur in the human ear.

It has also been proposed (for example in "Objective Measurement Method for Estimating Speech Quality of Low Bit Rate Speech Coding", Irii, Kurashima, Kitawaki and Itoh, NTT Review, Vol 3. No. 5 September 1991) to use an artificial voice signal (i.e. a signal which is similar in a spectral sense to the human voice, but which does not convey any intelligence) in conjunction with a conventional distortion analysis measure such as the cepstral distance (CD) measure, to measure the performance of telecommunications apparatus.

It would appear obvious, when testing apparatus such as a coder which is designed to encode human speech, and when employing an analysis method based on the human ear, to use real human speech samples as was proposed in the above paper by Beerends and Stemerdink. In fact, however, the performance of such test systems is not particularly good.

BRIEF SUMMARY OF THE INVENTION

Accordingly, it is an object of the invention to provide an improved telecommunications testing apparatus and method. It is another object of the invention to provide a telecommunications testing apparatus which can provide a measure of the performance of telecommunication system which matches the subjective human perception of the performance of the system.

The present invention provides telecommunications testing apparatus comprising a signal generator (7) for supplying a test signal which has a spectral resemblance to human speech but corresponds to more than one speaker, and analysis means (8) for receiving a distorted signal which corresponds to said test signal when distorted by telecommunications apparatus (1) to be tested, and for analyzing said distorted signal to generate a distortion perception measure which indicates the extent to which the distortion of said signal will be perceptible to a human listener.

Other aspects and preferred embodiments of the invention will be apparent from the following description and claims.

BRIEF DESCRIPTION OF THE DRAWINGS

The invention will now be illustrated, by way of example only, with reference to the accompanying drawings in which:

FIG. 12a is a diagram of distortion amplitude over pitch and time axes representing a low magnitude nonlinear distortion of the speech signal depicted in FIG. 8a.

DETAILED DESCRIPTION OF EXEMPLARY EMBODIMENTS

Figure 1:
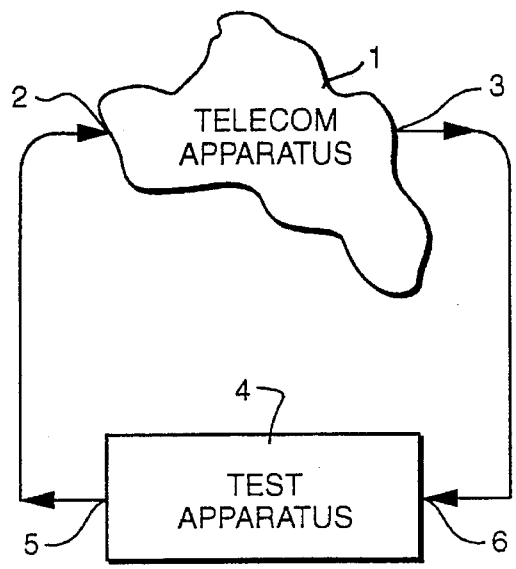
FIG. 1 is a block diagram showing the arrangement of an embodiment of the invention in use.

Referring to FIG. 1, telecommunications apparatus 1 comprises an input port 2 and an output port 3. Test apparatus 4 comprises an output port 5 for coupling to the input port 2 of the telecommunications apparatus under test, and an input port 6 for coupling to the output port 3 of the telecommunications apparatus under test.

Figure 2:
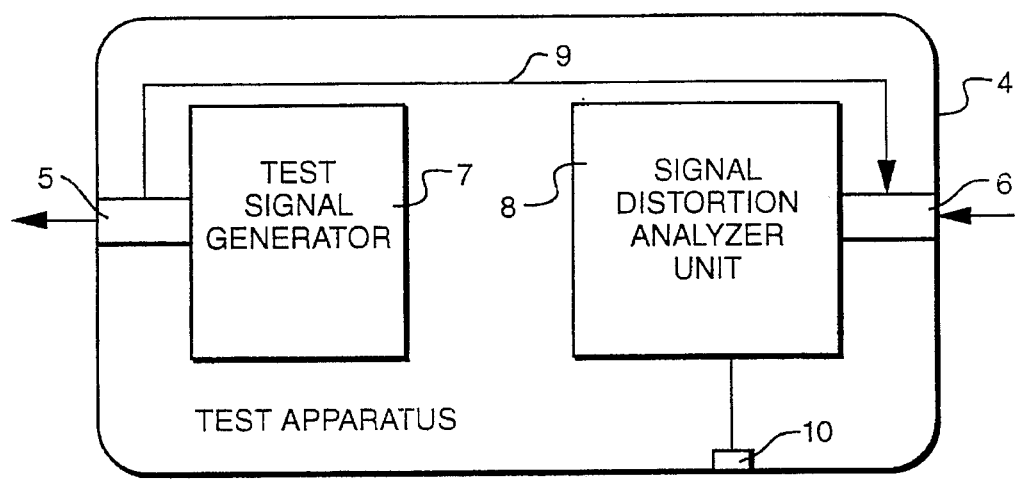
FIG. 2 is a block diagram showing in greater detail the components of an embodiment of the invention.
Figure 3:
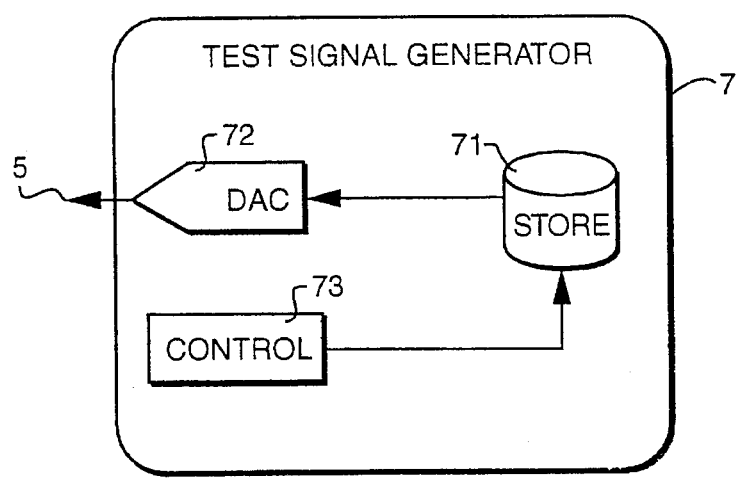
FIG. 3 is a block diagram showing in greater detail a test signal generator forming part of the embodiment of FIG. 2.

Referring to FIG. 2, the test apparatus 4 comprises a test signal generator 7 coupled to the output port 5, for supplying a speech-like test signal thereto, and a signal analyzer unit 8 coupled to the input port 6 for analyzing the signal received from the telecommunications apparatus 1. As will be discussed in greater detail below, the analyzer 8 also utilises an analysis of the test signal generated by the test signal generator 7, and this is indicated in this embodiment by a path 9 running from the output port 5 to the input port 6.

Also provided from the analysis unit 8 is a measurement signal output port 10 at which a signal indicating some measure of the acceptability of the telecommunications apparatus (for example, distortion) is provided either for subsequent processing, or for display on a visual display unit (VDU), now shown.

FIRST EMBODIMENT

Speech Signal Generation

In its simplest form, the artificial speech generator may merely comprise a digital store 71 (e.g. a hard disc or digital audio tape) containing stored digital data from which a speech signal can be reconstituted. The stored data may be individual digitised speech samples, which are supplied in succession from the store 71 to a signal reconstituting means 72 (e.g. a digital to analog convertor (DAC)) connected to the output port 5. The sample data stored in the store 71 comprises one or more speech utterances lasting several seconds in length (for example, on the order of ten seconds).

Alternatively, the store 71 may store speech data in the form of filter coefficients to drive an LPC speech synthesizer, for example, or higher level data (e.g. phoneme, pitch and intensity data) to drive a phoneme synthesizer comprising the reconstituting means.

A control circuit 73 (e.g. a microprocessor) controls the operation of the store unit 71 to select a particular test signal to be output.

Figure 4:
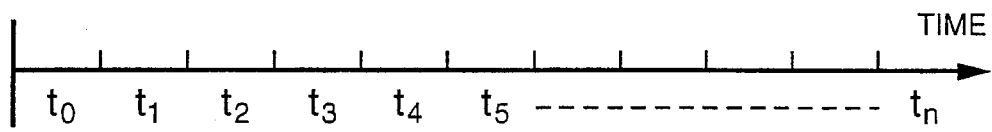
FIG. 4 shows schematically the structure of a test signal over time.

Referring to FIG. 4, the test signal data stored in the store 71 is reconstituted to form a test signal comprising a plurality of segments $t_0, t_1, t_2 \ldots t_n$.

Each of the segments $t_0$–$t_n$ typically corresponds to a different speech sound (e.g. a different phoneme) or to silence. One known artificial voice test signal is disclosed in CCITT Recommendation P50 (Recommendation on Artificial Voices, Vol. Rec P50, Melbourne 1988, published by CCITT). In the P50 test signal, each segment lasts 60 ms.

The segments are grouped into patterns each comprising a randomly selected sequence of 16 predetermined spectral patterns, defined by the recommendation, which spectrum densities $S_i$ (f) equal to Spectrum density $S_i(f) =$ $$\frac{1}{A_{ij} + 2 \sum_{j=1}^{12} A_{ij}[\cos(2\pi i f)]}, i = 1, 2, \ldots 16$$

The transition between the different segments in each pattern is arranged to be smooth. Of the patterns, 13 correspond to voiced speech and the remaining 3 to unvoiced speech. A sequence of speech can either be stored on a recording medium and reproduced, or can be generated from stored data using a vocoder as described in the above reference Irii paper, for example.

The P50 signal has a long term and short term spectral similarity to speech when averaged over about 10 seconds. Accordingly, preferably, the speech sequence shown in FIG. 4 lasts at least this long.

Distortion

The signal leaving the telecommunications apparatus 1 under test differs from the test signal supplied to the input port 2. Firstly, there will be time-invariant linear distortions of the signal, resulting in overall changes of amplitude, and in filtering of the signal so as to change its spectral shape. Secondly, noise will be added to the signal from various sources, including constant noise sources (such as thermal noise) and discontinuous sources (such as noise burst, dialling pulses, interference spikes and crossed lines). Thirdly, there will be nonlinear and time-varying distortions of the signal due to nonlinear elements such as codecs and time-varying elements such as echo cancellers and thresholders.

The presence of nonlinear distortion can cause intermodulation between noise and the signal, and the distortion at the output port 3 therefore depends not only upon the signal and the apparatus 1 but also the noise. Further, the presence of time-varying distortion means that the distortion applied to any given temporal portion of the signal depends upon preceding temporal portions of the signal and noise; for instance, if high level noise is present before the beginning of a phoneme, a voice activity detector may not clip the phoneme at all, whereas if the phoneme is preceded by silence, the voice activity detector will heavily clip the beginning of the phoneme causing substantial distortion.

Analyzer 8

The analysis according to the present invention is intended to provide an acceptability signal output which depends upon the distortion of the test signal similarly to the response of a human ear, as it is presently understood.

Without dwelling upon the physical or biological mechanisms giving rise to these phenomena, it is well known that the human perception of sound is affected by several factors. Firstly the presence of one sound "masks" (i.e. suppresses the perception of) another sound in a similar spectral (frequency) region. The extent to which the other sound is masked depends upon, firstly, how close in pitch it is to the first sound and, secondly, to the amplitude of the first sound.

Thus, the human perception of errors or distortions in a sound depends upon the sound itself; errors of low amplitude in the same spectral region as the sound itself may be masked and correspondingly be inaudible (as, for example, occur with quantising errors in sub band coding).

Secondly, the masking phenomenon has some time dependence. A sound continues to mask other sounds for a short period after the sound is removed; the amplitudes of the subsequent sounds which will be masked decays rapidly after the removal of the first sound. Thus, errors or distortions will be masked not only by the present signal but also by portions of the signal which preceded it (to a lesser extent). This is referred to as "forward masking". It is also found that the application of a high level sound just after a lower level sound which would otherwise have been audible retrospectively makes the earlier sound inaudible. This is referred to as "backward masking".

Thirdly, the human ear is not directly responsive to the frequency, but to the phenomenon perceived as "pitch" of a sound, which corresponds to a nonlinear warping of the frequency axis.

Fourthly, the human ear is not directly responsive to amplitude, even when a signal is not masked, but to the phenomenon perceived as loudness which is a nonlinear function of amplitude.

Accordingly, in this embodiment the analyzer 8 is arranged to process the signal received from the telecommunications equipment 1 to determine how significant or objectionable the distortion produced thereby in the test signal will be to a human listener, in accordance with the above known characteristics of the human ear.

More particularly, the analysis unit 8 is arranged to determine what the response of the human ear will be to the test signal generated by the test signal generator 7; and then to similarly process the signal from the telecommunications apparatus output 3 to determine the extent to which it perceptibly differs from the original test signal, by determining the extent to which distortions are perceivable.

Figure 5A:
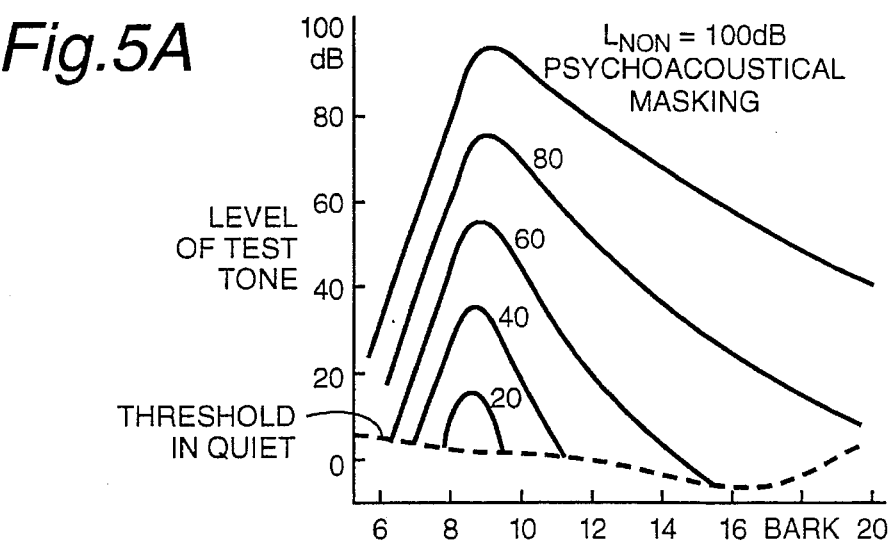
FIG. 5a is a graph of the level of masked noise (dBs) against a pitch (e.g. approximately logarithmic frequency) axis in critical band rate (Bark) units, for different levels of masking noise.

FIG. 5a shows schematically the variation of the spectral masking threshold (the threshold above which a second sound is obscured by a first) for narrow band noise at a fixed frequency. The five curves are for progressively higher levels of masking noise, and it will be seen that the effect of increasing the level of masking noise is to cause a roughly linear increase in the masking threshold at the masking noise frequency, but also to change the shape of the threshold away from the noise frequency (predominantly towards higher frequencies). The masking effect is therefore amplitude nonlinear with respect to the amplitude of the masking noise.

For a given masking noise level, the width (measured, for example, at the 3 dB points below the central masking frequency) of the masked spectral band varies with the frequency of the masking noise. This variation of the width of the masked bands is related to the characteristic of the human auditory filter shape for frequency discrimination, and therefore to the human perception of pitch.

Figure 5B:
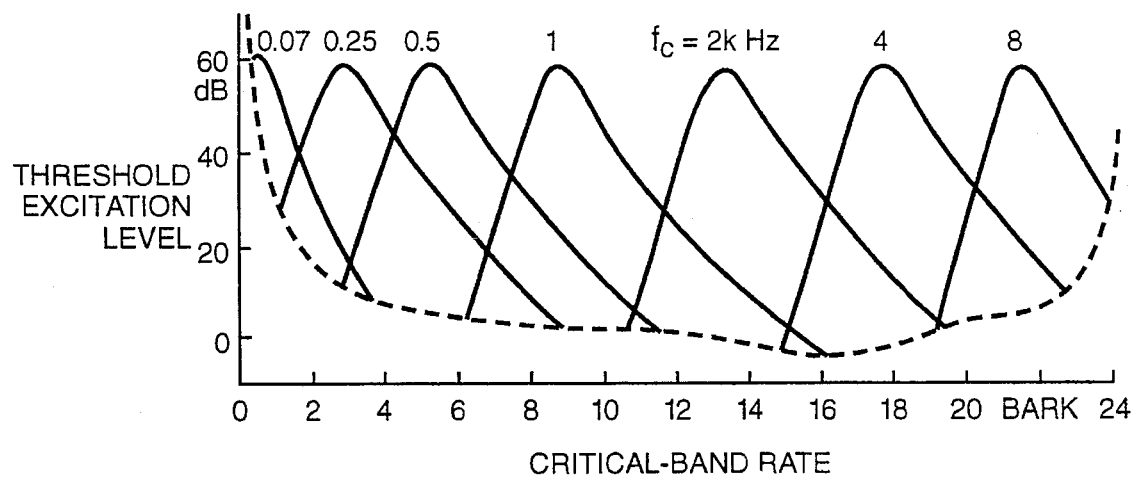
FIG. 5b is a diagram showing the variation of excitation threshold on a pitch (approximately logarithmic frequency) axis in critical band rate (Bark) units, for masking noise at seven given frequencies.

Accordingly, as shown in FIG. 5b, a scale of pitch, rather than frequency, can be generated from the frequency scale by warping the frequency scale, so as to create a new scale in which the widths of masking bands are constant. FIG. 5b shows the critical band rate, or Bark, scale which is derived by considering a set of narrow band masking tones at different frequencies which cross at the −3 dB point. This scale is described, for example, in "Audio Engineering and Psychoacoustics: Matching Signals to the Final Receiver, the Human Auditory System", J. Audio Eng. Soc. Vol. 39, March 1991, Zwicker and Zwicker.

The critical bands shown in FIG. 5b are similar in shape (on the frequency axis) below 500 hertz when represented on a linear frequency scale. Above 500 hertz, they are similar in shape when viewed on a logarithmic frequency scale. Since the telephony band width is typically 300 to 3150 hertz, and telecommunications apparatus is often band limited to between these limits, the transformation to the pitch scale in this embodiment ignores the linear region below 500 hertz with only a small compromise in accuracy.

Figure 6:
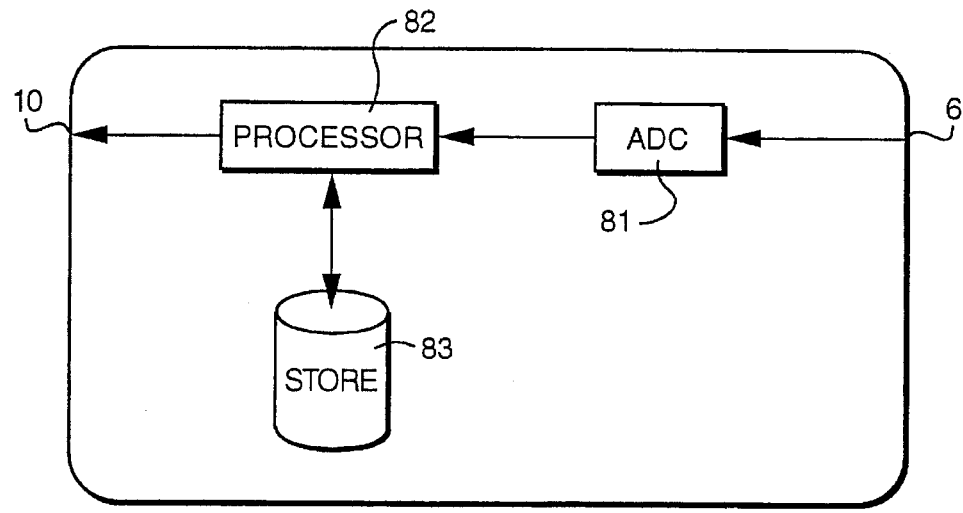
FIG. 6 is a block diagram showing in greater detail an analysis unit forming part of the embodiment of FIG. 2.

Referring to FIG. 6 the analysis unit 8 comprises an analog to digital converter (ADC) 81 arranged to receive signals from the input port 6 and produce a corresponding digital pulse train; an arithmetic processor 82 (for example, a microprocessor such as the Intel 80486 processor, or a digital signal processing device such as the Western Electric DSP 32C or the Texas Instruments TMS C30 device), coupled to receive the digital output of the ADC 81, a memory device 83 storing instruction sequences for the processor 82 and providing working memory for storing arithmetic results, and an output line 84 from the processor 82 connected to the output 10.

Figure 7B:
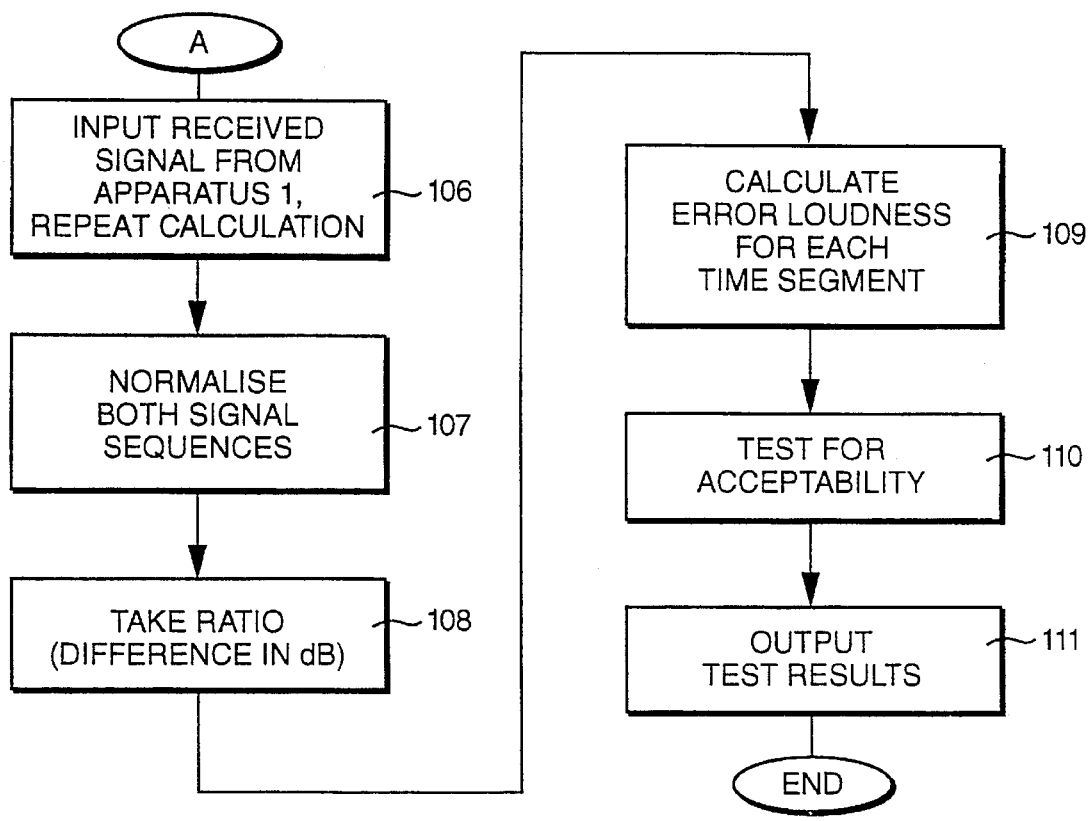
FIGS. 7a and 7b form a flow diagram indicating schematically the operation of the analysis unit in the embodiment of FIG. 6.
Figure 7A:
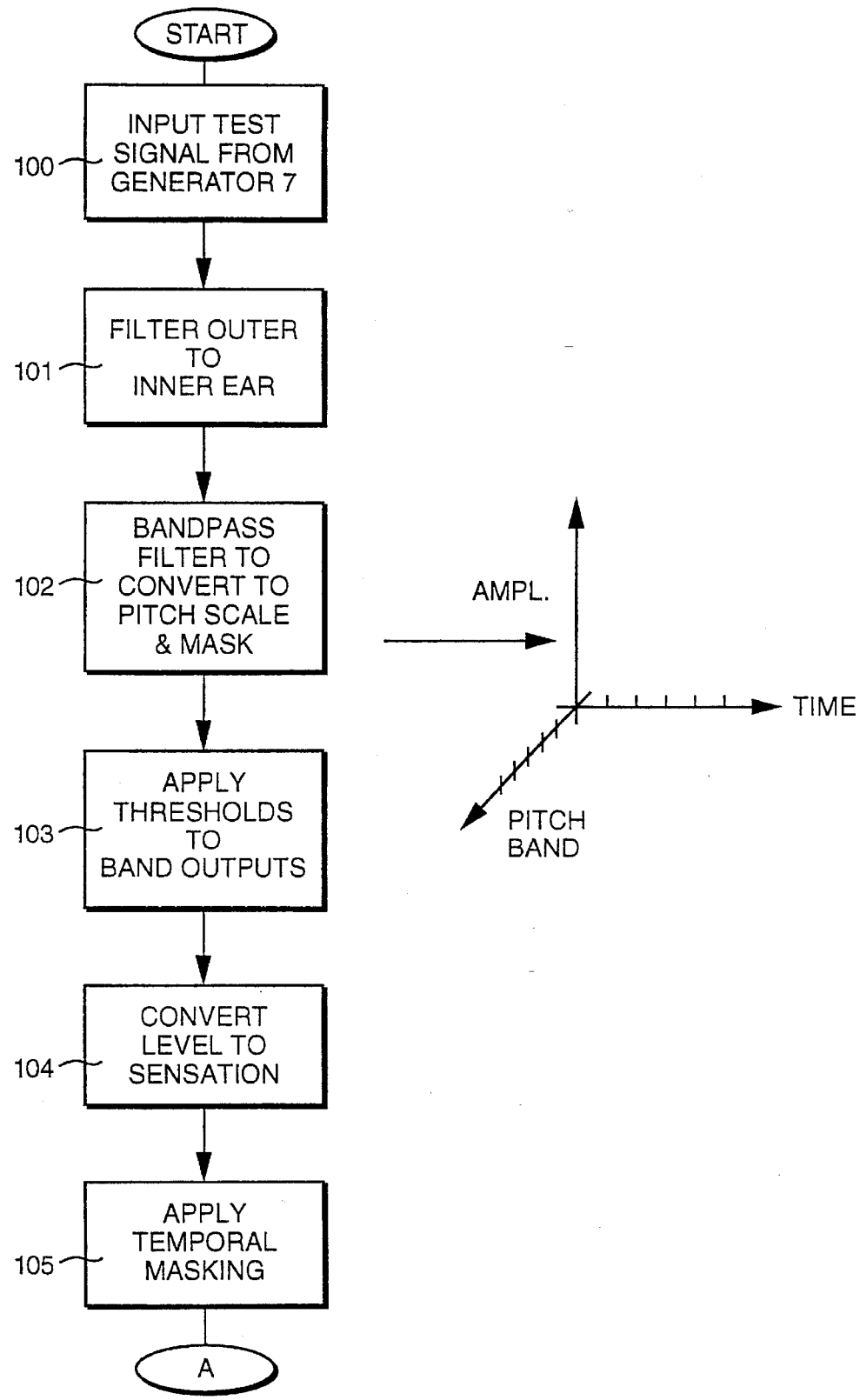

Referring to FIG. 7, the processes performed by the processor 82 in this embodiment will now be described.

Firstly, the test signal supplied from the test signal generator 7 is input directly to the input port 6 in a step 100, without passing through telecommunications apparatus 1.

In the next step 101, the signal from the ADC 81 is filtered by a filter which corresponds to the transfer function between the outer portions of the ear and the inner ear. The filtering may typically be performed by executing a digital filtering operation in accordance with filter data stored in the memory 83. The filter may be characterised by a transfer function of the type described in "Psychoacoustic models for evaluating errors in audio systems", J. R. Stuart, Procs. IOA, vol. 13, part 7, 1991.

In fact, the transfer function to the inner ear will vary slightly depending upon whether the sound is coupled closely to the ear (e.g. through a headset) or more distantly (e.g. from a loudspeaker); accordingly, the processor 82 and store 83 may be arranged to store the characteristics of several different transfer functions corresponding to different sound locations related to the type of telecommunications apparatus 1 on test, and to select an appropriate filter in response to a user input specifying the telecommunications apparatus type. The filtered signal after the execution of the step 101 refers corresponds to the signal as it would be received at the inner ear.

Next, in a step 102, the signal is split into a plurality of spectral bands having bandwidths which vary logarithmically with frequency so as to effect the transformation from frequency to pitch. In this embodiment, the signal is bandpass filtered into 20 bands each one-third of an octave in bandwidth, from 100 hertz to 8 kilohertz, according to International Standard ISO 532B; the ISO band filters are similar in shape when viewed on a logarithmic frequency axis and are well known and documented. The average signal amplitude in each of the 20 bands is calculated each 4 milliseconds, and the signal after filtering thus comprises a series of time segments each comprising 20 frequency band amplitude values. This bandpass filtering is performed for all the values in the test signal (which lasts on the order of several seconds, for example, 10 seconds).

The relatively wide filters take account of the masking within each filter band, and the broad, overlapping skirts of the filters ensure that spectral masking due to neighbouring frequencies is also taken account of.

Next, in step 103, frequency dependent auditory thresholds specified in International Standard ISO 226 are applied to each of the band outputs. This simulates the effect of the minimum audibility threshold indicated in FIG. 5a.

Next, in step 104, the bandpass signal amplitudes are converted to a phon or sensation level which is more equivalent to the loudness with which they would be perceived by a human auditory system. The conversion is non-linear, and depends upon both signal amplitude and frequency. Accordingly, to effect the conversion, the equal loudness contours specified in international standard ISO 226 are applied to each of the band outputs. Both these equal loudness contours and the thresholds used in step 103 are stored in the memory 83.

Next, in step 105, a temporal masking (specifically forward masking) is performed by providing an exponential decay after a significant amplitude value. In fact, the rate of decay of the masking effect depends upon the time of application of the masking sound; the decay time is higher for a longer time of application than for a shorter time. However, in this embodiment, it is found sufficient to apply a fixed exponentially weighted decay, defined by $y=56.5*10^{(-0.01x)}$, (where y represents level and x represents time) which falls between the maximum decay (corresponding to over 200 milliseconds duration) and the minimum decay (corresponding to 5 milliseconds duration) encountered in practice.

In applying the forward masking, at each time segment for each bandpass filter amplitude, masking values for the corresponding bandpass in the three following time segments are calculated, using the above exponential decay. The three values are compared with the actual amplitudes of those bands, and if higher than the actual amplitudes, are substituted for the actual amplitudes.

As noted above, it is also possible for a sound to mask an earlier occurring sound (so called "backward masking"). Preferably, in this embodiment, the forward masking process is replicated to perform backward masking, using the same type of exponential decay, but with different numerical constants (in other words, for each time segment, values of masking for earlier occurring time segments are calculated, and if higher than the actual amplitudes for those bands, are substituted for the actual amplitudes).

Thus, after step 105 the calculated signal data comprises a succession of time segment data each comprising 20 bandpass signal amplitudes, thresholded so that some amplitudes are zero, and the amplitude of a given band in a given time segment being dependent upon the amplitudes of corresponding bands in past and future time segments due to the forward and backwards masking processing.

This corresponds to a surface indicating, along the signal pitch and time axes, the masking effect which the test signal would have had upon the human ear if directly applied without the telecommunications apparatus 1.

Figure 8A:
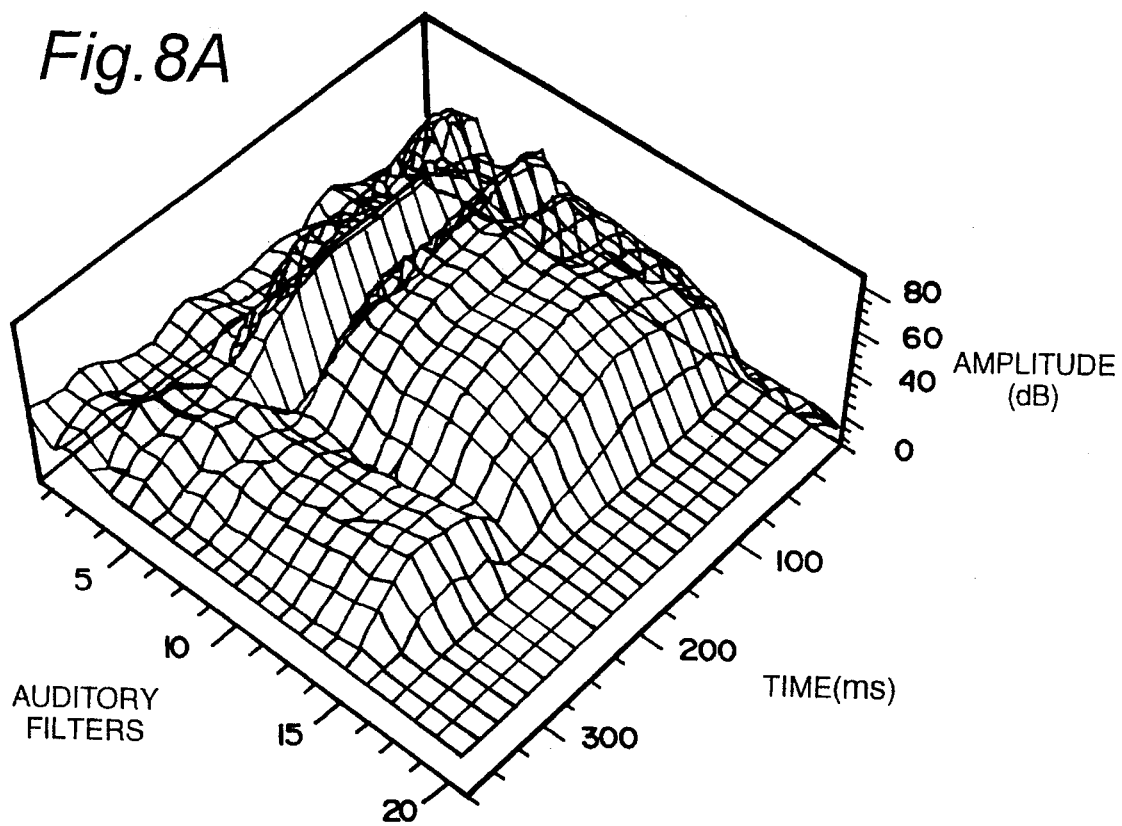
FIG. 8a shows schematically an estimate formed in this embodiment of amplitude of excitation, as a function of time and pitch, which would be produced in the human ear by a predetermined speech-like signal.
Figure 8B:
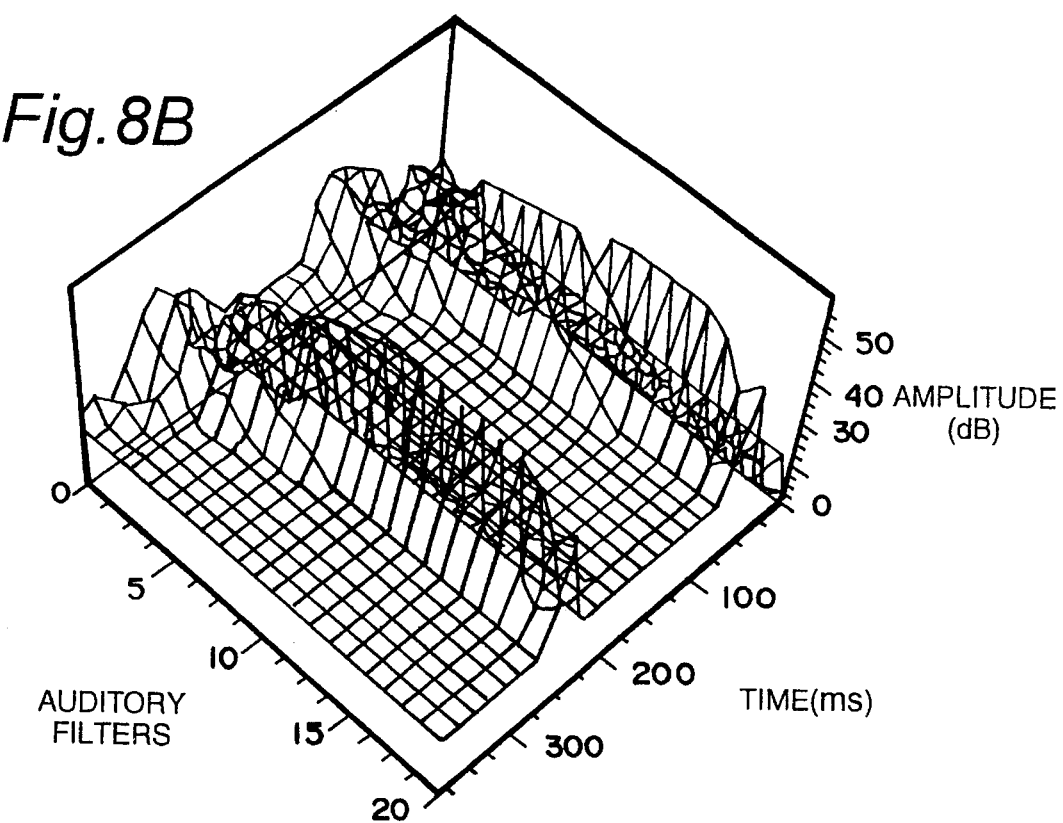
FIG. 8b is a corresponding plot showing the excitation which would be produced by two spaced clicks.

FIGS. 8a and 8b show excitation surfaces generated by the above process. FIG. 8a corresponds to a speech event comprising a voiced sound followed by an unvoiced sound; the formant structure of the first sound and the broad band nature of the second sound can readily be distinguished. FIG. 8b shows a corresponding surface for two clicks, and the effect of the forward masking stage 105 of FIG. 7 is clearly visible in the exponential decays therein.

Next, in step 106, the test signal generator 7 repeats the test signal but this time it is supplied to the input port 2 of the telecommunications apparatus 1, and the output port 3 thereof is connected to the input port 6 of the test apparatus 4. The calculation stages 101–105 are then repeated, to calculate a corresponding surface for the received signal from the telecommunications apparatus 1.

Having calculated the effect on the ear (excitation) of the original test signal and of the output from the telecommunications apparatus (the distorted test signal), the difference in the extent to which the two excite the ear corresponds to the level of distortion of the test signal as perceived by the human auditory system. Accordingly, the amplitude transfer function of the telecommunications apparatus is calculated, for each segment, by taking the ratio between the corresponding bandpass amplitudes (or where, as in FIGS. 8a or 8b, the bandpass amplitudes are represented on a dB scale, by taking the difference between the amplitude in dBs). To avoid an overall gain term in the transfer function, which is irrelevant to the perceived distortion produced by the telecommunications apparatus, each bandpass term may be normalised by dividing (or, when represented in dBs, subtracting) by the average amplitude over all bandpass filter outputs over all time segments in the test signal sequence, in step 107.

If the original test signal and the output of the telecommunications apparatus 1 are identical, but for some overall level difference (that is to say, if the telecommunications apparatus 1 introduces no distortion), the ratio between each bandpass filter output of the two signals will be unity, and the logarithmic difference in dBs in amplitude will be zero; accordingly, the corresponding difference plot to FIG. 8a or FIG. 8b would be completely flat at all times and in all pitch bands. Any deviation is due to distortion in the telecommunications apparatus. Additive distortion errors will appear as peaks, and signal loss will appear as troughs, relative to the undistorted average level.

The perceptual significance given to these errors is not directly dependent upon their amplitude, but rather upon loudness which is a nonlinear function of amplitude, and a function of frequency. Calculation of the perceptual loudness is given in International Standard ISO 532B. However, this specification applies to binaural sound, and for monaural sound (as commonly found in telecommunications applications) it is possible to use a simpler calculation of loudness based on the established monaural telephony perceptual weightings for loudness given in CCITT Recommendation P79 (Blue Book Volume V, Melbourne 1988, CCITT). This method of estimating the error loudness takes account of the fact that errors at some frequencies are perceived more easily, and are hence given greater weighting, that those at other frequencies. For each time segment in the signal sequence, in this embodiment, an error magnitude is calculated as:

$$ErrLoud_t = 0.8 \sum_{n=1}^{14} Er_n * 10^{(-0.0175*WSn)}$$

Where:

ErrLoud$_t$ error loudness at time t (+ve and −ve parts calculated separately)

n nth ⅓rd octave band from 200 Hz to 4 kHz

ER$_n$ error amplitude in dB.

Figure 9:
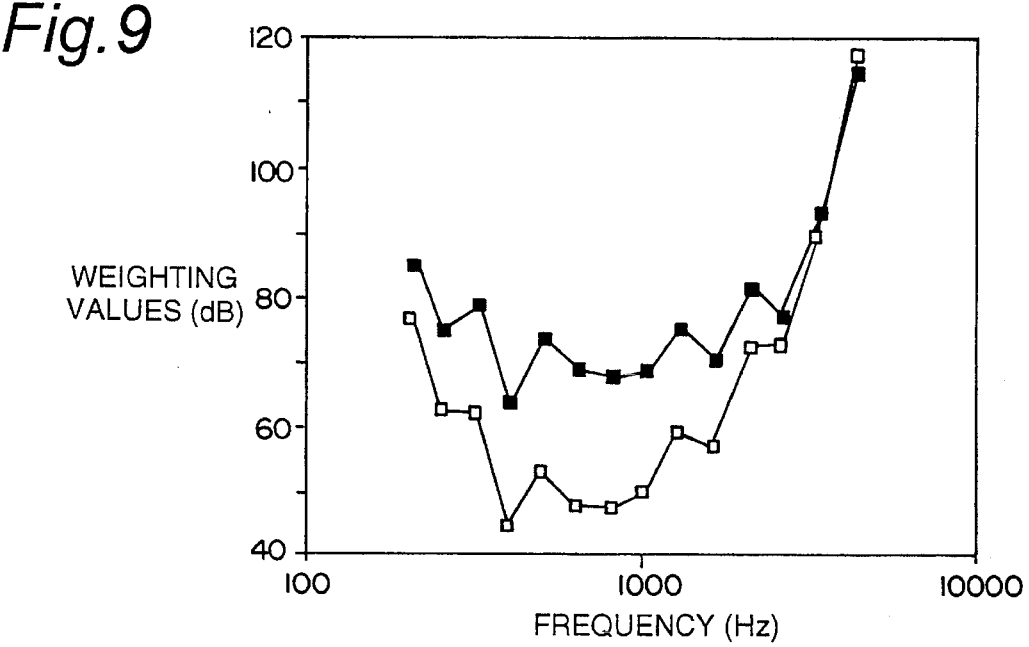
FIG. 9 is a plot of weighting values against frequency for converting amplitude to perceived loudness in this embodiment.

W$_{Sn}$ SLR weighting for the nth frequency for a narrow band model of the error extending between 200 hertz and 4 kilohertz, where the Weighting coefficients derived from the P79 Recommendation are as shown in FIG. 9.

For a broad band telephony model making use of all 20 band path outputs, the corresponding error loudness is calculated as:

$$ErrLoud_t = 1.28 \sum_{n=1}^{21} Er_n * 10^{(-0.0175*WSn)}$$

In this case, the value of n covers all 20 bands from 100 hertz to 8 kilohertz.

The additive error (positive errors) and short fall errors (negative error values) are separately cumulated to give positive and negative subtotals.

Figure 10:
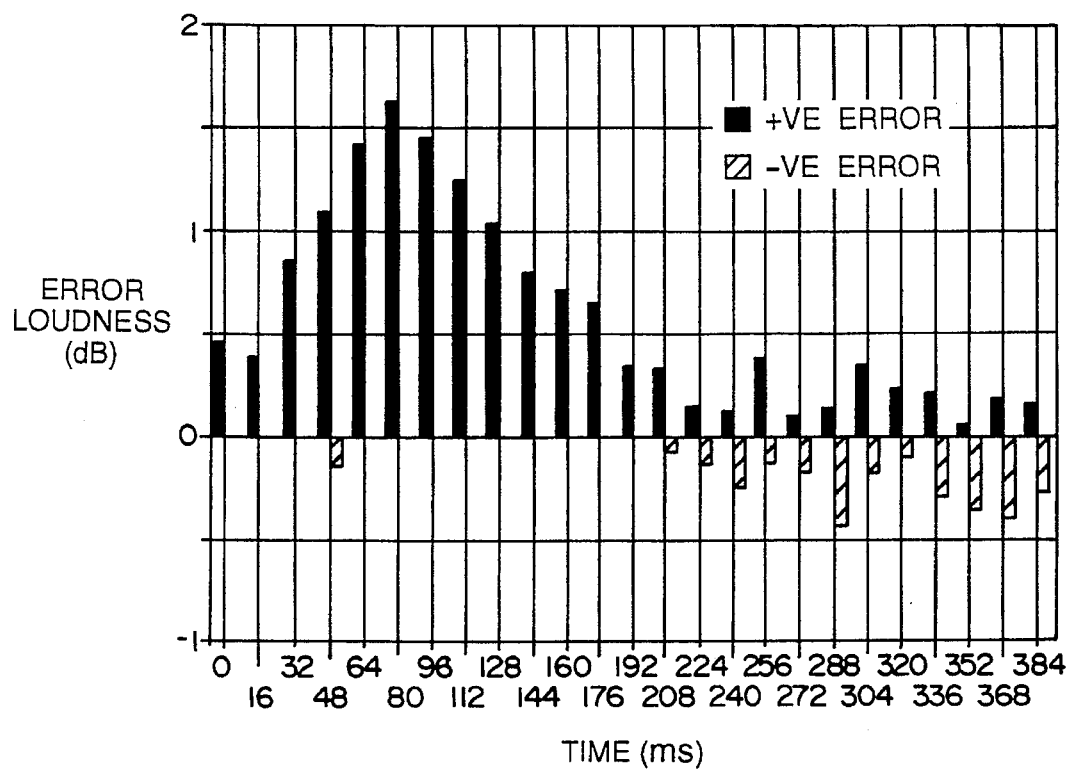
FIG. 10 is an exemplary plot of error loudness values for successive time segments calculated by the analysis means according to FIG. 7.
Figure 11:
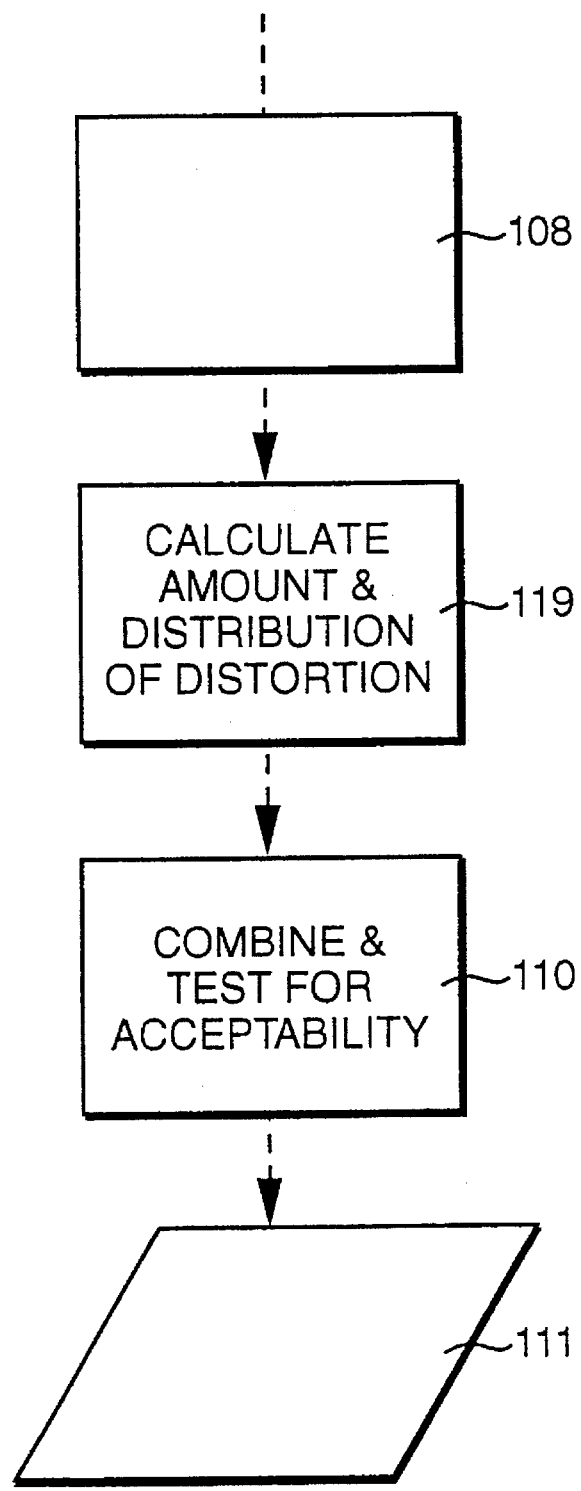
FIG. 11 corresponds to a modified portion of FIG. 7b in a further embodiment of the invention.

As shown in FIG. 10, the result of the calculation stage 109 is a time sequence of time segment error loudness values. In step 110, in this embodiment, the acceptability or otherwise of the telecommunications apparatus is found directly from the data shown in FIG. 9, by taking for example the peak error loudness value and/or average error loudness value. One or both of these criteria are then output as the measure of distortion of the telecommunications apparatus 1 to the output port 9 in step 111.

SECOND EMBODIMENT

In the second embodiment, the analysis unit 8 is the same or similar to that in the first embodiment. However, the test signal generating unit 7 does not utilise the P50 test signal, but instead generates a different type of artificial, speech-like test signal.

Whilst the P50 test signal is acceptable for many purposes, it is observed to lack a full range of fricative sounds. Furthermore, it has a rather regular and monotonous long term structure, which sounds rather like a vowel-consonant-vowel-consonant . . . sequence. As discussed above, however, since many telecommunications systems include time dependent elements such as automatic gain controls or voice switches, the distortion applied to any given portion of the test signal is partly dependent upon the preceding portion of the test signal; in other words, the context of that portion of the speech signal within the time sequence of the signal as a whole.

Accordingly, in this embodiment, a small, representative, subset of speech segments (selected from the tens of known phonemes) is utilised, and a test signal is constructed from these sounds assembled in different contextual sequences. Since distortion is being measured, it is more important that the test sequence should include successions of sounds which are relatively unlike one another or, more generally, are relatively likely to cause distortion when one follows another. In a simpler form of this embodiment, the test signal might comprise each of the selected from a high, low or zero level, so that the test signal enables each representative speech segment (phoneme) to be tested following prefixed sounds of different levels. The length of the prefixing signal is selected to extend over the time constants of the system under test; for example, codec adaptation and active gain control takes on the order of a few seconds, whereas speech transducer transient response is on the order of a few milliseconds.

Further details of this embodiment are to be found in our earlier filed UK Patent Application No. 9312758.7 corresponding to U.S. patent application Ser. No. 08/564,069 filed Dec. 14, 1995; PCT/GB94/01305 filed Jun. 17, 1994; and EP 94300076.0 filed Jan. 6, 1994, filed on 21 Jun. 1993, entitled "Speech-like test stimulus" the contents of which are incorporated herein by reference in their entirety. The test signal of this embodiment could also be utilised with conventional analysis means.

THIRD EMBODIMENT

In a third embodiment of the invention, the test signal generator 7 operates in the same manner as in the first or second embodiments. However, the operation of the analysis unit 8 differs in steps 102 to 110.

Although the logarithmically spaced filters of the first embodiment are found to be a reasonable approximation to the pitch scale of the human ear, it is found that an even better performance is given by the use of filters which are evenly spaced on a Bark scale (as discussed above). Accordingly, in step 102, the twenty bandpass filters are rounded exponential (roex) filters spaced at one Bark intervals on the pitch scale. The rounded exponential function is described in "Suggested formulae for calculating auditory-filter bandwidths and excitation patterns", (J. Acoust. Soc. Am. 74, 750–753 1983), B. C. J. Moore and M. R. Glasburg.

Rather than calculating the average signal amplitude in each band every four milliseconds, in this embodiment, the signal amplitude is calculated over different averaging periods for the different bands, averaging over two milliseconds for the highest pitch band and 48 milliseconds for the lowest pitch band, with intervening averaging times for the intervening bands. It is found that varying the temporal resolution in dependence upon the pitch (or, in general, the frequency) so as to resolve over a longer interval at lower frequencies gives a substantially improved performance.

For subsequent processing, as before, for each two millisecond time segment, an array of bandpass filter output values are generated. For bands lower than the highest pitch, values are repeated more than once for intervening time segments (for example, for the lowest pitch band, each value is repeated 24 times for the two millisecond time segments between each 48 millisecond average amplitude value). It would, of course, be possible to perform a numeric interpolation between succeeding values, rather than merely repeating them.

The steps 103–106 are the same as in the first embodiment (with the adjustment of numerical constants to reflect the different filter responses).

In this embodiment, rather than calculating the loudness of the distortion, a different test measure which is more closely related to the subjective "listening effort" measure $Y_{LE}$ are derived.

The sequence of sets of bandpass auditory excitation values (corresponding to a surface along the time and pitch axes) is divided into contiguous sectors of length 96 milliseconds (i.e. 48 successive 2 millisecond segments) so as to include at least two different values for the lowest pitch band. The total amount of error or error activity, is calculated as:

$$\text{Error Activity, } E_A = 10\log \sum_{i=1}^{48} \sum_{j=1}^{20} |c(i,j)|$$

where c(i,j) is the error value in the $i^{th}$ time segment and $j^{th}$ pitch band of the error surface sector to be analyzed.

This gives an indication of the absolute amount of distortion present.

Then, the distribution of the error over time and pitch (or rather, the entropy of the distortion, which corresponds to the reciprocal of the extent to which the energy is distributed) is calculated as follows:

$$\text{Error entropy, } E_E = -\sum_{i=1}^{48} \sum_{j=1}^{20} a(i,j) = \ln(a(i,j))$$

$$\text{where } a(i,j) = \frac{|c(i,j)|}{E_A}$$

The log term in the above expression controls the extent to which the distribution of energy affects the entropy $E_E$, acting as a non-linear compression function.

Figure 12A:
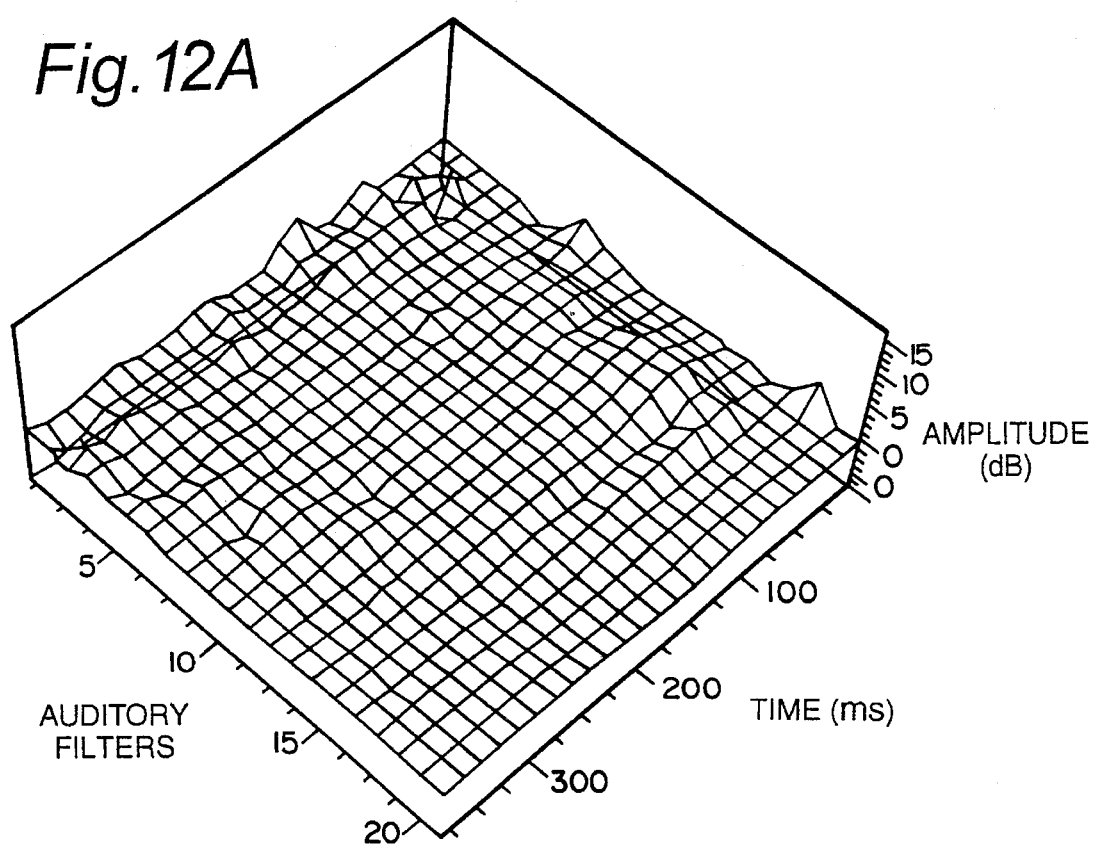
Figure 12B:
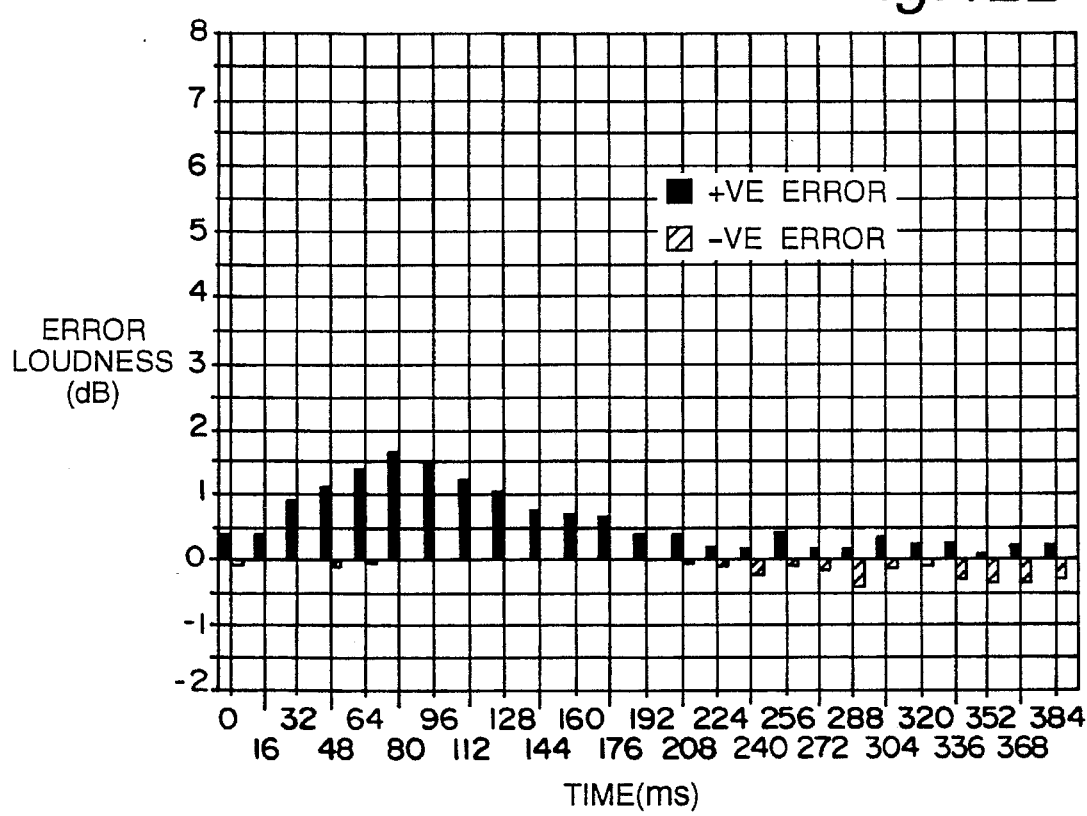
FIG. 12b is a plot of perceived error loudness derived from FIG. 12a and corresponding in form to FIG. 10.

It is found that the error activity and error entropy criteria together correspond well to the subjectively perceived level of distortion, as the listener will find a high level of error considerably more noticeable if it is concentrated at a single pitch over a short period of time, rather than being distributed over pitch and time. Accordingly, in this embodiment, as shown in FIGS. 12a and 12b, rather than calculating loudness in the step 109 of FIG. 7b, a step 119 of calculating the amount and distribution (the activity and entropy) of the distortion is performed.

In the step 110, the two measures may separately be subjected to thresholds, or they may be combined and the combined measure thresholded. For example, they may be summed or multiplied together with appropriate weightings in a further step.

FOURTH EMBODIMENT

In this embodiment the speech signal may be generated according to either the first embodiment or the second embodiment. However, the analysis unit 8, rather than performing the above-described masking calculations, directly simulates the human ear, as described for example in "Digital Filter Simulation of the Basilar Membrane", Computer Speech and Language, No. 3 1989, Ambikairajh, Black, and Linggard (incorporated herein in its entirety by reference). Such a model will receive as input the signal from the ADC 81, and generate a series of outputs at each time segment which corresponds to the effects on parts of the human hearing structure of the distorted signal from the telecommunications apparatus 1. The outputs of the model are then combined by appropriate processing and decision logic (for example, a neural network or a fuzzy logic controller) based on empirically derived correlation with actual listener responses to provide a signal indicating the perceptual significance of the distortion in the signal.

Aspects of the analysis method of this embodiment could also be used with other test signals (for example, real human speech).

EFFECTS OF THE INVENTION

Referring to FIGS. 12a to 12b, the representation of various types of telecommunications apparatus distortion of the test signal of FIG. 8a by the first and second embodiments of the invention will now be illustrated.

FIG. 12a shows the error excitation surface produced by instantaneous amplitude distortion produced by adding low amplitude second and third order terms to the signal. The distortion was characterised as "barely audible" by a human listener. It will be seen that the error loudness figures are small and mostly positive, as shown in FIG. 12b.

Figure 13A:
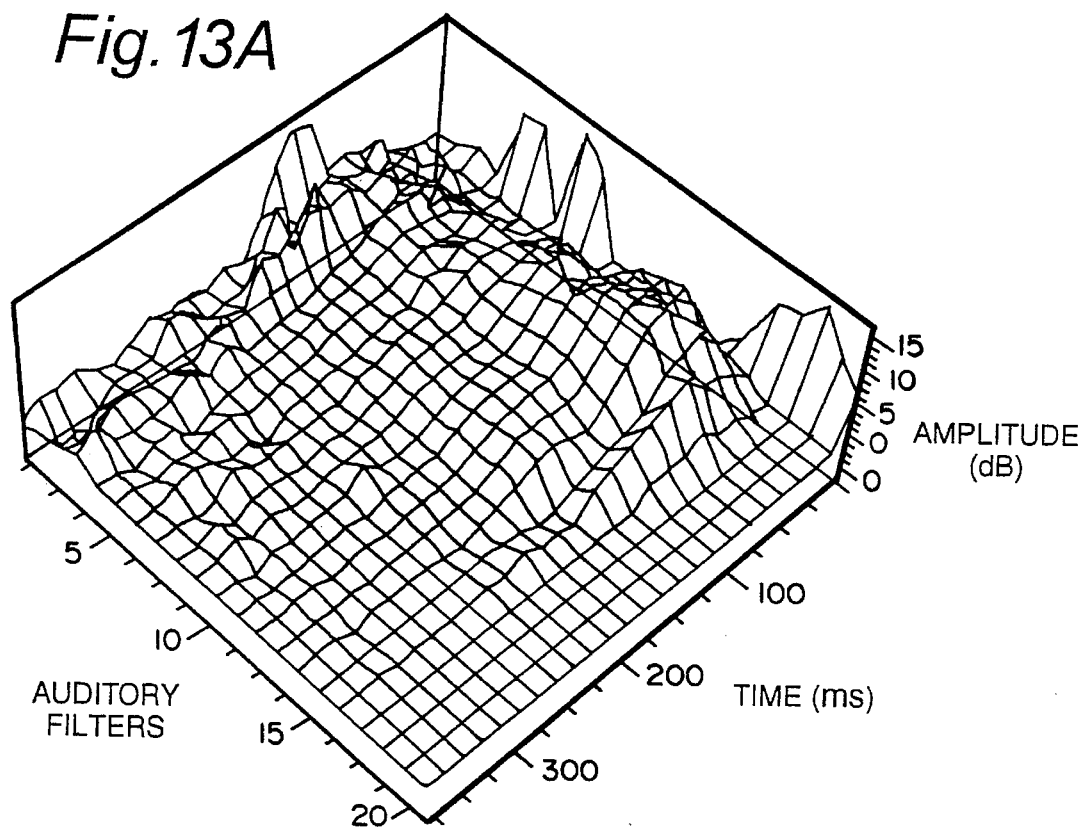
FIG. 13a corresponds to FIG. 12a but with higher amplitude nonlinear distortion.
Figure 13B:
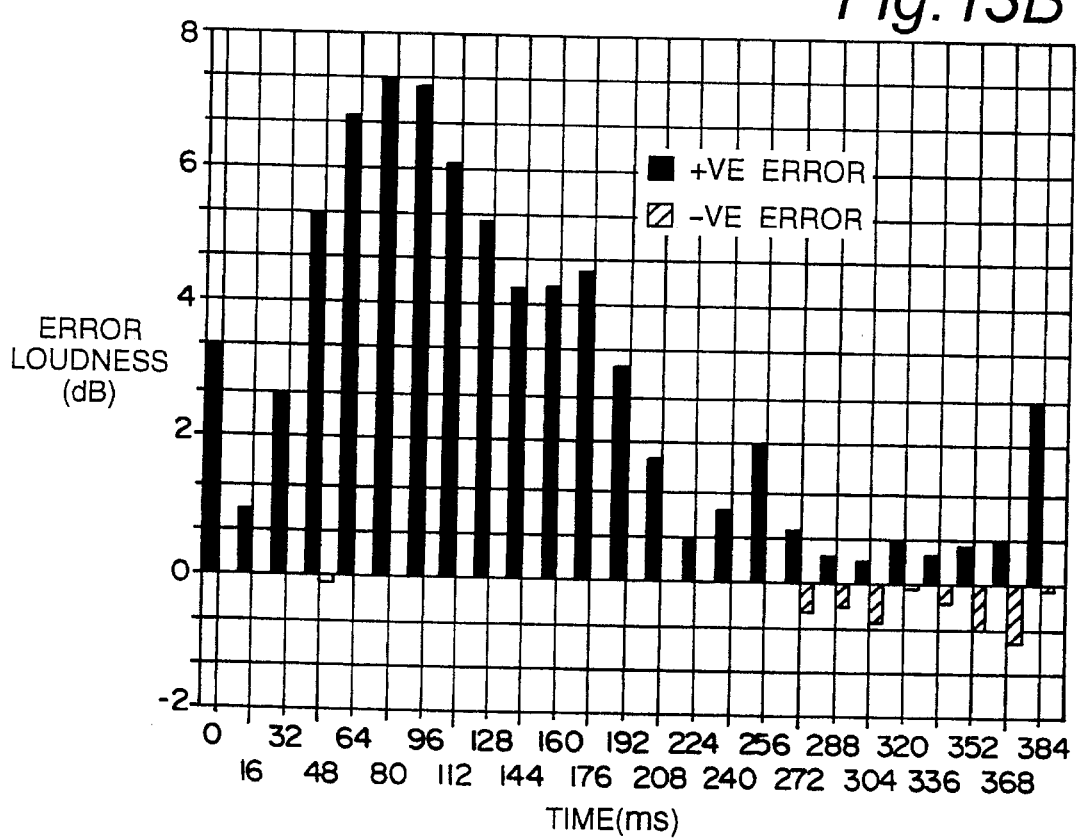
FIG. 13b likewise corresponds to FIG. 12b.

FIG. 13a shows the corresponding error amplitude surface for fully audible nonlinear distortion of the same type, but with higher value second and third order terms. The amplitude of the error and the error loudness (FIG. 13b) are both much larger. Additionally, it will be seen that the majority of the distortion loudness coincides with the voiced part of the test signal of FIG. 8a, since this contains low frequency formant tones whose harmonics are perceptually significant.

Figure 14A:
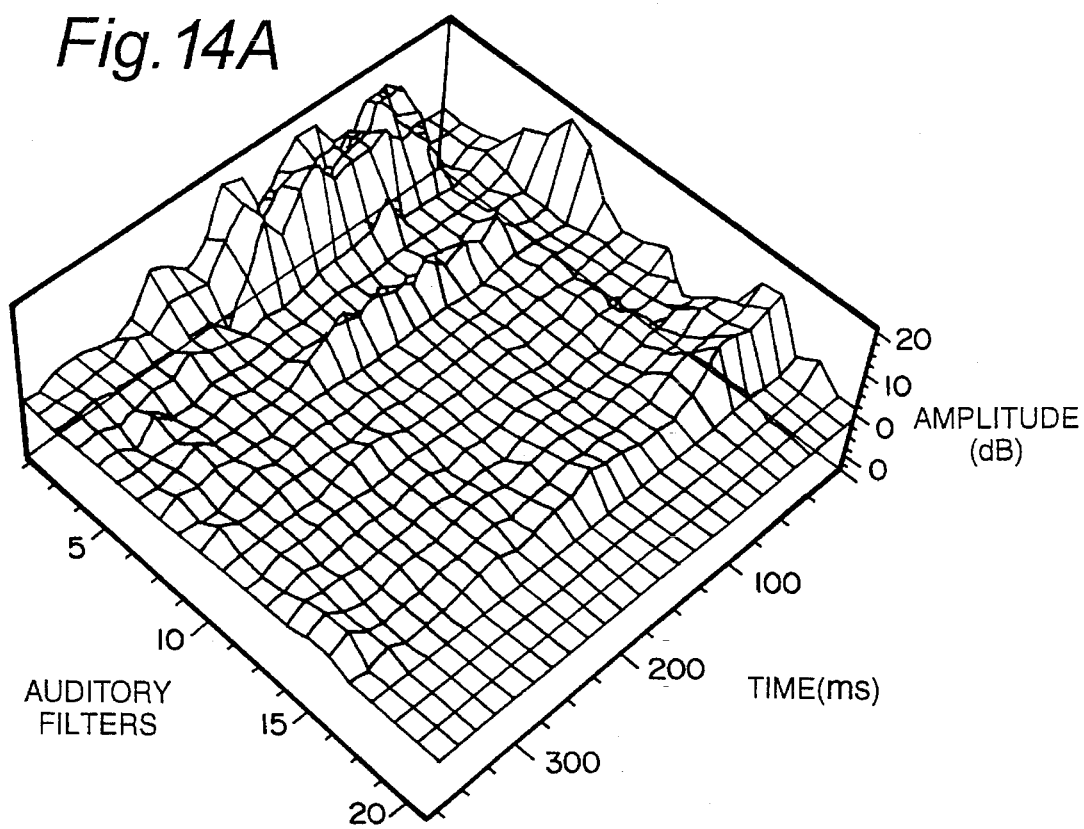
FIG. 14a corresponds to FIG. 12a but with the substitution of MNRU distortion.
Figure 14B:
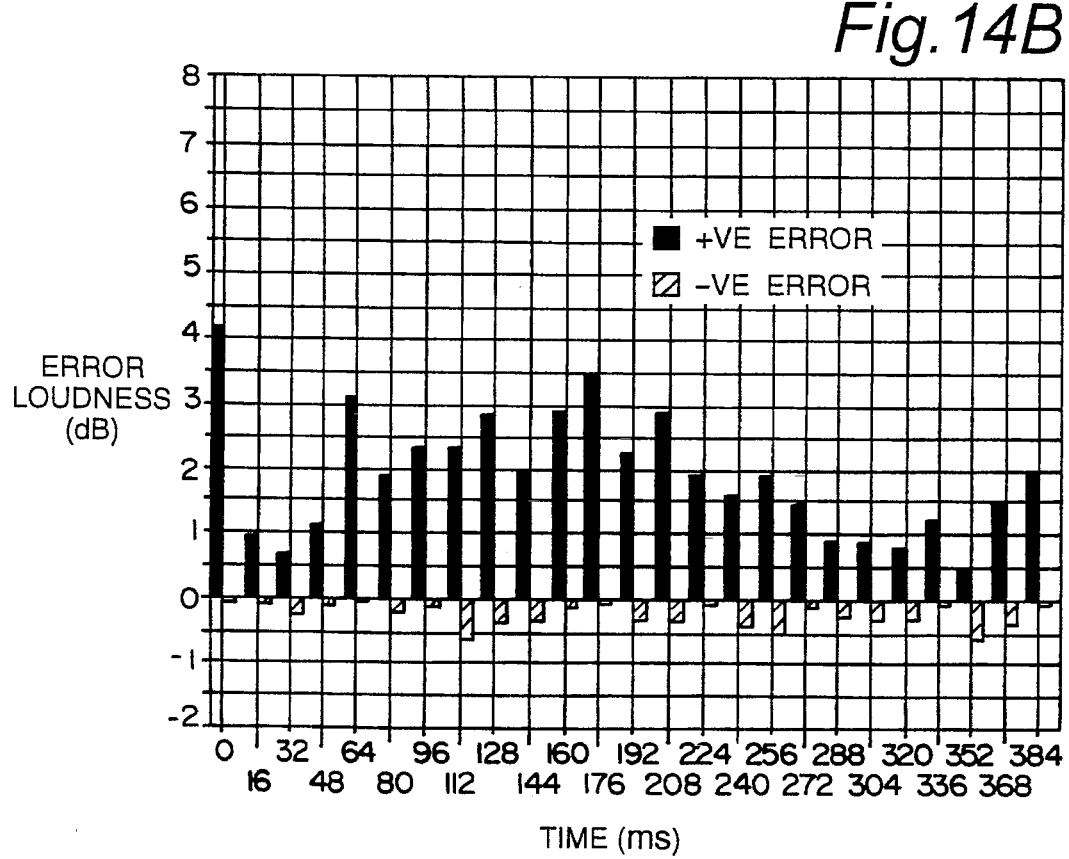
FIG. 14b is a corresponding plot of error loudness over time.

Referring to FIGS. 14a and 14b, the effects of modulated noise reference unit (MNRU) distortion are shown. MNRU distortion is described in Annex A of CCITT Recommendation P81, and is designed to be theoretically equivalent to the distortion introduced by a single A Law PCM stage (of the kind widely used in telecommunications systems). The level of distortion was characterised as fully audible by a human listener. Again, it will be seen from FIG. 14a that the perceptual distortion is associated chiefly with formants in the voiced part of the test signal.

Figure 15A:
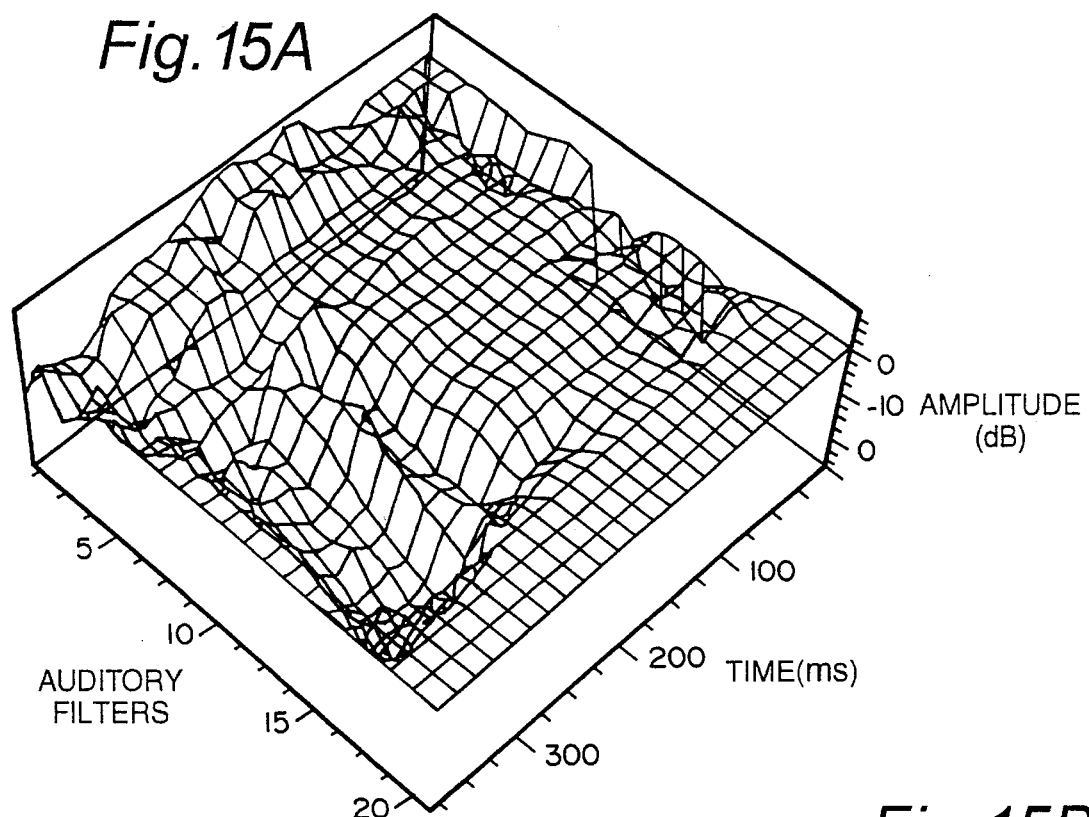
FIG. 15a corresponds to FIG. 12a but with the substitution of cross-over distortion.
Figure 15B:
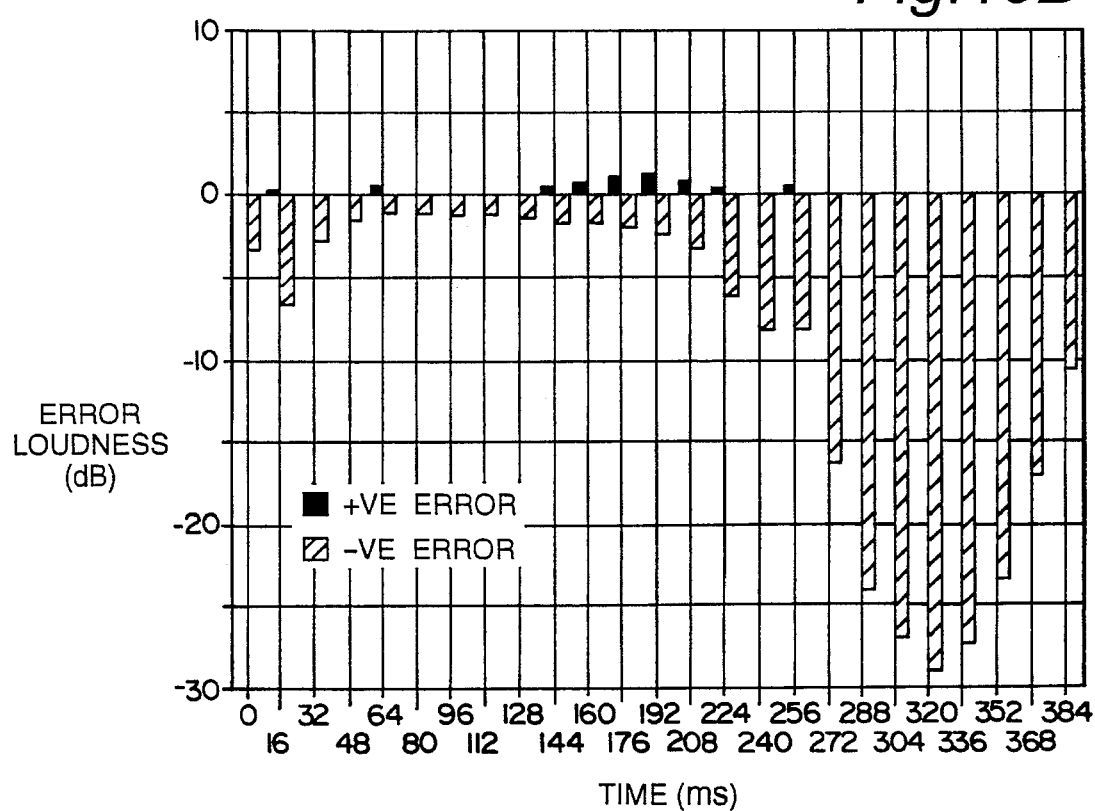
FIG. 15b is a corresponding plot of error loudness over time.

Referring to FIGS. 15a and 15b, when crossover distortion is supplied (i.e. distortion of the kind y=mx+c for x greater than zero and y=mx–c for x less than zero) low amplitude signals are not transmitted, and so the lower energy unvoiced sound in the second part of the test signal is drastically attenuated. FIGS. 15a and 15b therefore suggest a very significant subjective impact of this kind of distortion, which corresponds with the reaction of the human listener.

Figure 16A:
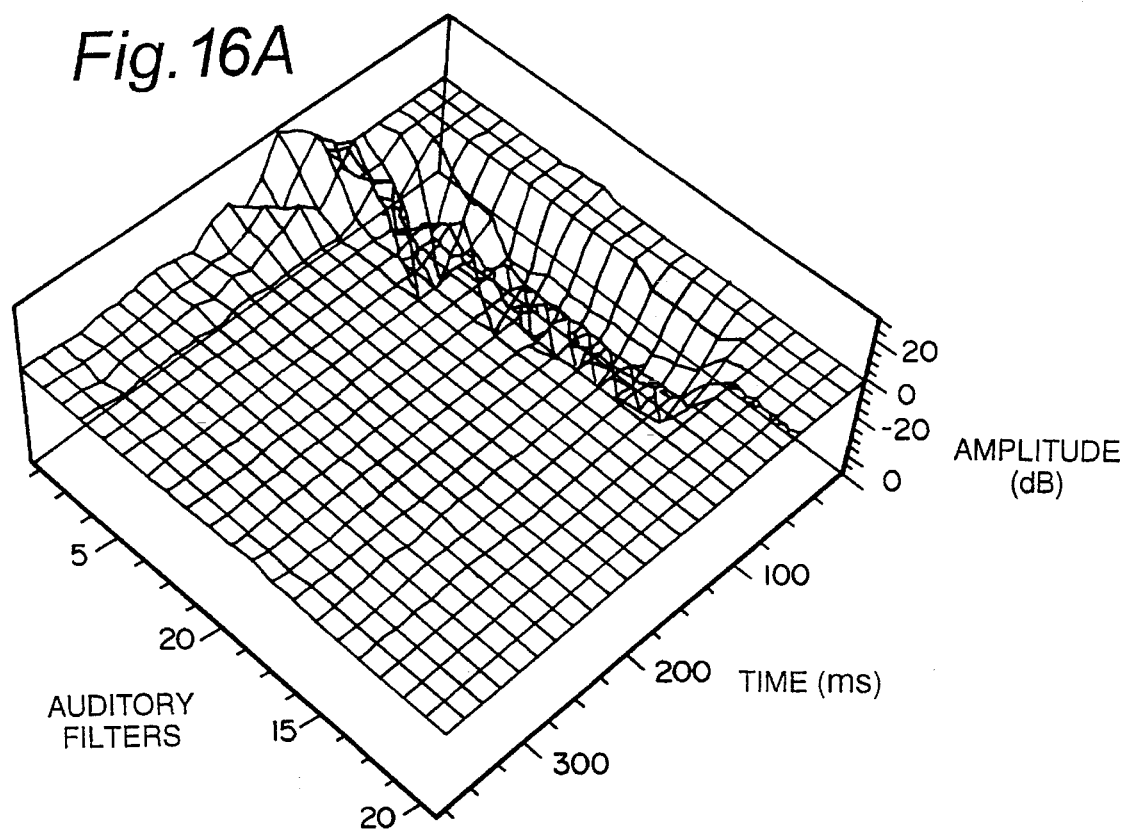
FIG. 16a corresponds to FIG. 12a but with the substitution of clipping distortion due to a voice activity detector.
Figure 16B:
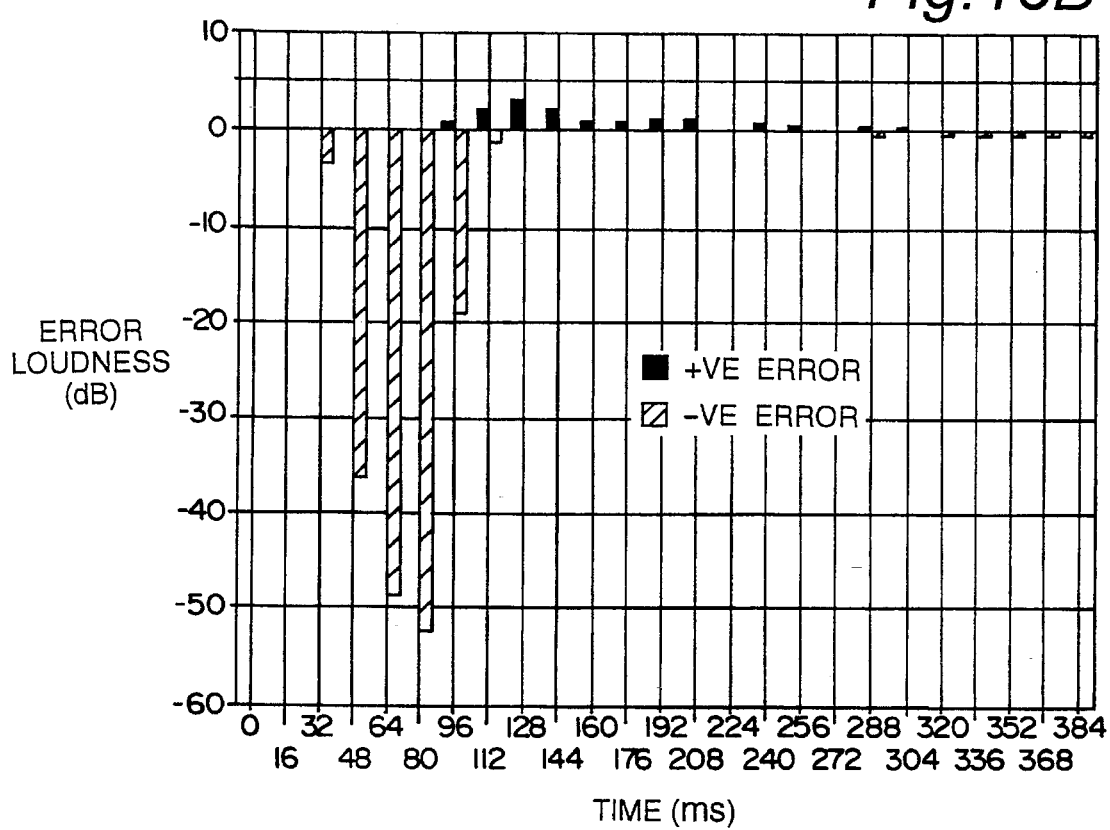
FIG. 16b is a corresponding plot of error loudness over time.

Finally FIGS. 16a and 16b illustrate the effects of a voice activity detector with a 50 millisecond onset time. In the initial part of the signal, there is a large negative error loudness because the signal has been clipped. The following positive error loudness is due to overshoot or settling. The error loudness values indicate a high level of perceived distortion, which coincides with the reaction of the human listener.

OTHER ALTERNATIVES AND MODIFICATIONS

It will be clear from the foregoing that many variations to the above described embodiments can be made without altering the principle of operation of the invention. For example, if the telecommunications apparatus is arranged to receive a digital input, the DAC 71 may be dispensed with. The signal from the output port 5 could be supplied in digital form to the input port 2 of the telecommunications apparatus and the ADC 81 may likewise be dispensed with. Alternatively, an electro-mechanical transducer could be provided at the output port 5 and the signal supplied as an audio signal. In the latter case the test signal may be supplied via an artificial mouth as discussed in CCITT P.51 Recommendation on Artificial Ear and Artificial Mouth, Volume 5, Rec P.51, Melbourne 1988 and earlier UK patent application GB2218299 (8730346), both incorporated herewith by reference. Similarly, the distorted speech signal could be received via an artificial ear acoustic structure as described in the above CCITT Recommendation and our earlier UK patent application GB2218300 (8730347) incorporated herein by reference. This would reduce the filtering needed in the step 101.

Although in the above described embodiments, a single decay profile for temporal masking is described, it may be preferred in alternative embodiments of the invention to provide a plurality (for instance 2) of decay rates for forward (and backward) masking, and to select the required decay rate in dependence upon the duration of the masking sound (i.e. the number of time segments over which the amplitude in one of the passbands exceeds a predetermined level). For example, maximum and minimum decays (corresponding to 200 milliseconds and 5 milliseconds duration respectively, may be defined by;

$$y=58.4039*10^{(-0.0059x)}$$

$$y=55.5955*10^{(-0.0163x)}$$

Although connections to an actual telecommunications apparatus have been described herein, it would equally be possible to programme a computing apparatus to simulate the distortions introduced by telecommunications apparatus, since many such distortions are relatively easy to characterise (for example, those due to VADs or codecs). Accordingly, the intention extends likewise to embodiments in which a signal is supplied to such simulation apparatus, and the simulated distorted output of the telecommunications apparatus is processed. In this way, the acceptability to a human listener of the combination of many complicated and nonlinear communications apparatus may be modelled prior to assembling or connecting such apparatus in the field.

Although the analysis unit 8 and test signal generator 7 have been described as separate hardware, in practice they could be realised by a single suitably processed digital processor; likewise, the telecommunications apparatus simulator referred to in the above embodiment could be provided by the same processor.

Although in the above described embodiments the analyzer unit 8 receives and analyses the test signal from the text signal generator 7, in practice the analyzer unit 8 could store the excitation data previously derived for the, or each of several, test sequences by an earlier analysis. Thus, the analyzer unit in such embodiments need not be arranged itself to analyze the undistorted test signal.

In the above described embodiments, other measures of the signal distortion than the error loudness, error activity or error entropy may readily be derived from the calculated data corresponding to FIGS. 11*a*, 13*a*, 14*a*, 15*a* and 16*a*. In fact, loudness of the distortion is only one of the measures of its effect on a human listener; others are listener fatigue and listening effort. For example, the distortion or error data calculated according to the above described embodiments may be employed as inputs to a statistical classifier, neural network, or fuzzy logic engine, operating in accordance with parameters derived empirically by comparative tests with genuine human listeners.

In this document, for convenience, the term "phoneme" is used to indicate a single, repeatable, human speech sound, notwithstanding that in its normal usage a "phoneme" may denote a sound which is modified by its speech context.

Unless the reverse is indicated or apparent, the features of the above embodiments may be combined in manners other than those explicitly detailed herein.

Although the embodiments described above relate to testing telecommunications apparatus, the application of novel aspects of the invention to other testing or analysis is not excluded.

Accordingly, protection is sought for any new matter or combination of new matter disclosed herein, together with variations thereof which would be apparent to the skilled reader.

I claim:

1. Test apparatus comprising:

a signal generator for supplying a test signal which has a spectral resemblance to human speech but which corresponds to more than one speaker, and analysis means for receiving a distorted signal which corresponds to said test signal when distorted by equipment to be tested, and for analyzing said distorted signal to generate a distortion perception measure which indicates the extent to which the distortion of said signal will be perceptible to a human listener, said analysis means including means to split the signal into a plurality of spectral bands having bandwidths which vary with frequency.

2. Apparatus as in claim 1 in which the analysis means includes means to filter the said test signal and/or distorted signal to generate a plurality of spectral component signals.

3. Apparatus as in claim 2, in which the analysis means is arranged to estimate, for each spectral component signal, the masking effect which that spectral component signal would produce on the human ear.

4. Apparatus as in claim 3 comprising means for generating a time sequence of successive spectral component values representative of component signal levels over a time interval, the time intervals being longer for lower frequency spectral component signals than for higher frequency spectral component signals.

5. Apparatus as in claim 1, in which the component signal bandwidths are, on a logarithmic frequency scale, approximately equal.

6. Apparatus as in claim 1 in which the component signal bandwidths are, on a Bark scale, approximately equal.

7. Apparatus as in claim 1, in which said analysis means is arranged to estimate the effect which said distortion would produce on the human ear taking into account the temporal persistence of said effect.

8. Apparatus as in claim 1, in which the analysis means is arranged to generate a time sequence of successive processed signal segments from said test signal and/or said distorted signal, the value of at least some signal segments being generated in dependence upon portion of said test signal and/or distorted signal which precede and/or succeed said signal segments.

9. Apparatus as in claim 1, in which the analysis means is arranged:

to decompose the distorted signal into a plurality of spectral component bands, the spectral component bands having bandwidths approximately equally spaced in pitch and being shaped to provide spectral masking;

to calculate the temporal masking of the signal due to preceding and/or succeeding temporal portions thereof;

to form, for each of the spectral component signals, a representation of the difference between the component signal of the distorted signal and a correspondingly calculated component of the test signal; and to generate said distortion perception measure from said difference measure.

10. Apparatus as in claim 9 in which the analysis means is arranged to generate a measure of the amount of distortion from said difference signals.

11. Apparatus as in claim 9 in which the analysis means is arranged to generate a mean of the spectral and temporal distribution of the distortion from said difference signals.

12. Apparatus as in claim 9 in which the analysis means is arranged to form a weighted sum of the spectral component differences, weighted in accordance with the relative loudness of sounds of reference amplitude at pitches corresponding to said component signals, and to generate said distortion perception measure in dependence upon said weighted sum.

13. Apparatus as in claim 1, in which said analysis means is arranged to perform a spectral decomposition of said test and/or distorted signals into a plurality of spectral component signals, said decomposition generating, for each spectral component signal, a time sequence of spectral component values each representative of component signal values over a time interval, the time interval for lower frequency component signals exceeding that for higher frequency component signals.

14. Apparatus as in claim 1, in which the analysis means is arranged to filter said test signal and/or said distorted signal in accordance with a filter calculated to correspond to the transfer function of portions of the human auditory system between the equipment to be tested and the inner ear.

15. Apparatus as in claim 14, in which the analysis means is arranged to be capable of selecting one of a plurality of different said transfer functions corresponding, respectively, to different equipment to be tested.

16. Apparatus as in claim 1, further comprising an artificial ear structure for receiving said distorted signal as an acoustic signal and for acoustically processing said distorted signal prior to analysis by the analysis means.

17. Apparatus as in claim 1, in which the signal generator further comprises an artificial mouth structure for receiving said test signal from the signal generator in acoustic form and for acoustically processing said test signal prior to supply to said telecommunications apparatus.

18. Apparatus as in claim 1, in which the signal generator comprises a digital store for storing speech data, and means for reconstituting a speech signal from the stored speech data.

19. Apparatus as in claim 18, in which the stored speech data comprises digitised sound samples and the reconstituting means comprises a digital to analog convertor.

20. Apparatus as in claim 18, in which the store is arranged to store parameters for control of a voice synthesizer comprising said means for reconstituting the speech signal.

21. Apparatus as in claim 1, in which the signal generator is arranged to generate a test signal which comprises a sequence formed of a predetermined, small, number of speech segments, the speech signal comprising several different portions including said segments such that each segment is represented in several different temporal contexts within said sequence, so as to vary the effect one each segment of time varying distortions in the telecommunications apparatus.

22. Apparatus as in claim 21, in which the test signal generator is arranged to vary the context for different said speech segments by prefixing said segments with predetermined signal portions of several different levels within a sequence of said test signal.

23. Apparatus as in claim 21 in which said segments are present in a plurality of different combinations within said sequence.

24. Telecommunications testing apparatus comprising:

a signal generator for supplying a test signal which has a spectral resemblance to human speech but corresponds to a more than one speaker, and analysis means for receiving a distorted signal which corresponds to said test signal when distorted by telecommunications apparatus to be tested, and for analyzing said distorted signal to generate a distortion perception measure which indicates the extent to which the distortion of said signal will be perceptible to a human listener;

in which the analysis means is arranged to estimate the effect which would be produced on the human auditory system by said test signal, and to estimate therefrom the effect which would be produced on the human auditory system by said distortion.

25. Apparatus according to claim 24, in which the analysis means includes means to estimate the effect which would be produced on the human auditory system by said distorted signal, and to determine the difference between the said effect and that due to the test signal, and to generate said distortion perception measure in dependence upon said difference.

26. Telecommunications testing apparatus comprising:

a signal generator for supplying a test signal which has a spectral resemblance to human speech but corresponds to a more than one speaker, and analysis means for receiving a distorted signal which corresponds to said test signal when distorted by telecommunications apparatus to be tested, and for analyzing said distorted signal to generate a distortion perception measure which indicates the extent to which the distortion of said signal will be perceptible to a human listener;

in which the analysis means is arranged so as to generate said distortion perception to depend upon perceptual loudness of said distortion, and to depend nonlinearly upon the amplitude of said distortion.

27. Telecommunications testing apparatus comprising:

a signal generator for supplying a test signal which has a spectral resemblance to human speech but corresponds to a more than one speaker, and analysis means for receiving a distorted signal which corresponds to said test signal when distorted by telecommunications apparatus to be tested, and for analyzing said distorted signal to generate a distortion perception measure which indicates the extent to which the distortion of said signal will be perceptible to a human listener;

in which the analysis means is arranged to generate a plurality of spectral component signals of said test signal and/or said distorted signal;

in which the component signals have different bandwidths, and in which the component signal bandwidths are selected so they correspond to equal masking amplitudes for signals centred within each band.

28. Telecommunications testing apparatus comprising: a signal generator for supplying a test signal, and analysis means arranged to:
   (a) receive a distorted signal which corresponds to said test signal when distorted by telecommunications apparatus to be tested,
   (b) to decompose said distorted signal into a plurality of spectral component bands, the spectral component bands having bandwidths approximately evenly spaced in pitch,
   (c) to calculate the temporal masking of the distorted signal,
   (d) to form for each of the spectral component signals, the difference between the distorted signal and a correspondingly calculated test signal component for a plurality of successive temporal portions of the test signal; and
   (e) to generate a distortion perception measure which indicates the extent to which the distortion of said signal will be perceptible to a human listener by deriving a measure of the said spectral component differences over a plurality of said temporal portions and said spectral components, and a measure of the distribution of said differences over said temporal portions and spectral components.

29. Telecommunications testing apparatus comprising: analysis means for receiving a distorted signal which corresponds to a test signal when distorted by telecommunications apparatus to be tested, and including means for generating a plurality of spectral component signals of said distorted signal, each said spectral component signal comprising a time sequence of successive spectral component values representative of component signal levels over a time interval, the time intervals being longer for lower frequency spectral component signals than for higher frequency spectral component signals,
   in which the component signals have different bandwidths which vary with frequency.

30. Apparatus as in claim 29 in which the component signal bandwidths are, on a Bark scale, approximately equal.

31. Apparatus for testing equipment for handling speech signals, said apparatus comprising:
   a signal generator for supplying a test signal, and
   analysis means arranged to receive a distorted signal which corresponds to said test signal when distorted by the apparatus to be tested,
   the analysis means including:
      means to decompose said distorted signal into a plurality of spectral component bands, the spectral component bands having different bandwidths which vary with frequency;
      means to calculate the temporal masking of the distorted signal by forming, for each of the spectral component signals, the difference between the distorted signal and a correspondingly calculated test signal component for a plurality of successive temporal portions of the test signal; and
      means to generate a distortion perception measure which indicates the extent to which the distortion of said signal will be perceptible to a human listener by deriving measure of the said spectral component differences over a plurality of said temporal portions and said spectral components.

32. Apparatus as in claim 31, wherein the spectral component bands are approximately evenly spaced in pitch, and wherein the means to generate a distortion perception measurement produces a measure of the distribution of said differences over said temporal portions and spectral components.

33. Apparatus as in claim 31 in which the analysis means is arranged to estimate the effect which would be produced on the human auditory system by said test signal, and to estimate therefrom the effect which would be produced on the human auditory system by said distortion.

34. Apparatus as in claim 33, in which the analysis means is arranged to estimate the effect which would be produced on the human auditory system by said distorted signal, and to determine the difference between the said effect and that due to the test signal, and to generate said distortion perception measure in dependence upon said difference.

35. Apparatus as in claim 31, in which the analysis means is arranged to generate said distortion perception to depend upon perceptual loudness of said distortion, and to depend nonlinearly upon the amplitude of said distortion.

36. Apparatus as in claim 31 in which the analysis means is arranged to generate a measure of the spectral and temporal distribution of the distortion from said difference signal.

37. Apparatus as in claim 31 in which the analysis means is arranged to form a weighted sum of the spectral component differences, weighted in accordance with the relative loudness of sounds of reference amplitude at pitches corresponding to said component signals, and to generate said distortion perception measure in dependence upon said weighted sum.

38. Apparatus as in claim 31 in which said analysis means is arranged to generate, for each spectral component signal, a time sequence of spectral component values each representative of component signal values over a time interval, the time interval for lower frequency component signals exceeding that for higher frequency component signals.

39. Apparatus as in claim 31 in which the analysis means is arranged to filter said test signal and/or said distorted signal in accordance with a filter calculated to correspond to the transfer function of portions of the human auditory system between the telecommunications apparatus and the inner ear.

40. Apparatus as in claim 39 in which the analysis means is arranged to be capable of selecting one of a plurality of different said transfer functions corresponding, respectively, to different speech signal carrying equipment.

41. Apparatus as in claim 31 further comprising an artificial ear structure for receiving said distorted signal as an acoustic signal and for acoustically processing said distorted signal prior to analysis by the analysis means.

42. Apparatus as in claim 31 in which the signal generator further comprises an artificial mouth structure for receiving said test signal from the signal generator in acoustic form and for acoustically processing said test signal prior to supply to said equipment to be tested.

43. Apparatus as in claim 31 in which the signal generator comprises a digital store for storing speech data, and means for reconstituting a speech signal from the stored speech data.

44. Apparatus as in claim 43 in which the stored speech data comprises digitised sound samples and the reconstituting means comprises a digital to analogue convertor.

45. Apparatus as in claim 44 in which the store is arranged to store parameters for control of a voice synthesizer comprising said means for reconstituting the speech signal.

46. Apparatus as in claim 31 in which the signal generator is arranged to generate a test signal which comprises a sequence formed of a predetermined number of speech segments smaller than the number of commonly occurring human speech phonemes, the speech signal comprising several different portions including said segments such that each segment is represented in several different temporal contexts within said sequence, so as to vary the effect on each segment of time varying distortions in the equipment under test.

47. Apparatus as in claim 46 in which the test signal generator is arranged to vary the context for different said speech segments by prefixing said segments with predetermined signal portions of several different level within a sequence of said test signal.

48. Apparatus as in claim 47 in which said segments are present in a plurality of different combinations within said sequence.

49. Apparatus for testing humanly perceptible distortion of speech signal processing said apparatus comprising:

means for applying a test signal to speech signal processing circuits;

means for measuring the distribution and interaction over time and frequency of the spectral component differences within a distorted test signal output from said speech signal processing circuits; and means for generating a distortion perception measure based on said distribution and interaction over time and frequency of the spectral component differences.

50. Apparatus as in claim 49 wherein said means for generating a distortion perception measure also bases such measure on a comparative effect of the detected distortion from the standpoint of the effect of the original signal.

51. Apparatus as in claim 49 wherein said means for generating a distortion perception measure of the distorted test signal also bases such measure on its perceptual loudness and nonlinearly on its amplitude.

52. Apparatus as in claim 49 wherein said means for generating a distortion perception measure of the distorted test signal also bases such measure on component signal bandwidths selected to correspond to equal masking amplitudes for signals centered within each band.

53. A method of testing speech signal handling equipment to be tested, said method comprising:

supplying a test signal to the speech handling equipment, said test signal having a spectral resemblance to human speech but which does not correspond to a single speaker conveying intelligent content, analyzing the test signal as distorted by said speech signal handling equipment;

determining the extent to which the distortion of said signal will be perceptible to a human listener; and generating a distortion perception measure indicative of said determined extent;

said step of analyzing including splitting the signal into a plurality of spectral bands having bandwidths which vary with frequency.

54. A method as in claim 53 wherein the analysis comprises the steps of filtering the said test signal and/or distorted signal to generate a plurality of spectral component signals of said test signal and/or said distorted signal.

55. A method as in claim 54 in which an estimation is made, for each spectral component signal, of the masking effect which that spectral component signal would produce on the human ear.

56. A method as in claim 54 comprising the step of generating a time sequence of successive spectral component values representative of component signal levels over a time interval, the time intervals being longer for lower frequency spectral component signals than for higher frequency spectral component signals.

57. A method as in claim 53 comprising the steps of:

generating said test signal, passing said test signal through said equipment, and analyzing the distorted signal produced at the output of said equipment.

58. A method as in claim 53 further comprising steps of:

analyzing the extent to which said test signal would be perceptible to a human listener, deriving a measure of the difference between the perception of the test signal and of the distorted signal, and deriving said distortion perception measure in dependence upon said difference.

59. A method of testing telecommunications apparatus comprising:

analyzing a speech-like test signal which has a spectral resemblance to human speech but does not correspond to a single speaker conveying intelligent content, as distorted by said telecommunications apparatus;

determining the extent to which the distortion of said signal will be perceptible to a human listener; and generating a distortion perception measure indicative of said determined extent;

generating said test signal;

passing said test signal through said telecommunications test apparatus; and analyzing the distorted signal produced at the output of said telecommunications test apparatus;

analyzing the extent to which said test signal would be perceptible to a human listener;

deriving a measure of the difference between the perception of the test signal and of the distorted signal; and deriving said distortion perception measure in dependence upon said difference.

60. A method of testing equipment for handling speech signals, said method comprising the steps of:

supplying a test signal, receiving a distorted signal which corresponds to said test signal when distorted by the equipment under test, and decomposing said distorted signal into a plurality of spectral component bands, the spectral component bands having different bandwidths which vary with frequency;

calculating the temporal masking of the distorted signal to form, for each of the spectral component signals, the difference between the distorted signal and a correspondingly calculated test signal component for a plurality of successive temporal portions of the test signal; and generating a distortion perception measure which indicates the extent to which the distortion of said signal will be perceptible to a human listener by deriving a measure of the said spectral component differences over a plurality of said temporal portions and said spectral components.

61. A method as in claim 60 wherein the spectral component bands are approximately evenly spaced in pitch, and wherein the distortion perception measurement means produces a measure of the distribution of said differences over said temporal portions and spectral components.

62. Method for testing humanly perceptible distortion of speech signal processing circuits, said method comprising:

applying a test signal to speech signal processing circuits;

measuring the distribution and interaction over time and frequency of the spectral component differences within a distorted test signal output from said speech signal processing circuits; and generating a distortion perception measure based on said distribution and interaction over time and frequency of the spectral component differences.

63. Method as in claim 62 wherein said step of generating a distortion perception measure also bases such measure on a comparative effect of the detected distortion from the standpoint of the effect of the original signal.

64. Method as in claim 62 wherein said step of generating a distortion perception measure of the distorted test signal also bases such measure on its perceptual loudness and nonlinearly on its amplitude.

65. Method as in claim 62 wherein said step for generating a distortion perception measure of the distorted test signal also bases such measure on component signal bandwidths selected to correspond to equal masking amplitudes for signals centered within each band.

* * * * *